United States Patent
Oikawa et al.

(10) Patent No.: US 7,875,325 B2
(45) Date of Patent: Jan. 25, 2011

(54) OPTICAL FILM, POLARIZING PLATE, AND LIQUID-CRYSTAL DISPLAY DEVICE

(75) Inventors: Tokuju Oikawa, Minami-ashigara (JP); Michio Nagai, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/236,371

(22) Filed: Sep. 23, 2008

(65) Prior Publication Data

US 2009/0086130 A1 Apr. 2, 2009

(30) Foreign Application Priority Data

Sep. 27, 2007 (JP) .............................. 2007-251751

(51) Int. Cl.
*C09K 19/00* (2006.01)
*C09K 19/06* (2006.01)
*C09K 19/52* (2006.01)

(52) U.S. Cl. ..................... 428/1.1; 428/1.2; 428/1.21; 252/299.01; 252/299.4; 349/193; 430/20

(58) Field of Classification Search ................ 428/1.1, 428/1.2, 1.21; 349/193; 430/20, 270.1; 252/299.4, 252/299.01
See application file for complete search history.

(56) References Cited

U.S. PATENT DOCUMENTS

| 4,802,740 | A | * | 2/1989 | Hotta et al. ................. 349/124 |
| 5,568,290 | A | | 10/1996 | Nakamura |
| 7,524,553 | B2 | * | 4/2009 | Yoneyama et al. .......... 428/212 |
| 2008/0123189 | A1 | * | 5/2008 | Ikeda et al. ................. 359/485 |

FOREIGN PATENT DOCUMENTS

| JP | 7-151914 A | 6/1995 |
| JP | 7-191217 A | 7/1995 |
| JP | 8-021996 A | 1/1996 |
| JP | 8-094838 A | 4/1996 |
| JP | 2001-166146 A | 6/2001 |
| JP | 2001-188130 A | 7/2001 |

* cited by examiner

*Primary Examiner*—Geraldina Visconti
(74) *Attorney, Agent, or Firm*—Buchanan Ingersoll & Rooney PC

(57) ABSTRACT

An optical film comprising a transparent film, and, on the film, at least one layer formed by applying a composition comprising a titanium compound and/or a zirconium compound and a vinyl alcohol-based resin to a surface is disclosed.

12 Claims, No Drawings

OPTICAL FILM, POLARIZING PLATE, AND LIQUID-CRYSTAL DISPLAY DEVICE

CROSS-REFERENCE TO RELATED APPLICATIONS

This application claims benefit of priority under 35 U.S.C. 119 to Japanese Patent Application No. 2007-251751 filed on Sep. 27, 2007; and the entire contents of the application are incorporated herein by reference.

BACKGROUND OF THE INVENTION

1. Field of the Invention

The present invention relates to an optical film useful as a protective film for a polarizing plate and the like, and to a polarizing plate and a liquid-crystal display device employing it.

2. Related Art

Optical compensation sheets are used in various liquid-crystal display devices for solving a problem of panel coloration and for widening a viewing angle. Proposed is use of an optical compensation sheet having, as formed on a transparent support, an optically-anisotropic layer comprising liquid crystal molecules. It is known to dispose an alignment layer between the transparent support and the optically-anisotropic layer of the optical compensation sheet (for example, see JPA Nos. hei 7-191217, hei 8-21996 and hei 8-94838). The optical compensation sheet of the type requires adhesiveness between the transparent support and the alignment layer, and adhesiveness between the alignment and the optically-anisotropic layer comprising liquid crystal molecules. An alignment layer may be subjected to a treatment of rubbing, electric field application, magnetic field application, irradiation with light or the like to exhibit an aligning ability; however, fine dust or contaminants, if any, adhering to the alignment layer may detract from the uniformity in aligning ability. In particular, in rubbing treatment, the film surface is rubbed, and therefore the treatment requires a countermeasure to static charge generation. Accordingly, in general, a water-soluble resin cured film is used for the alignment layer, and in particular, a hydroxyl group-having resin such as polyvinyl alcohol based is used for it.

On the other hand, a preferable protective film for a polarizing plate is optically transparent, and shows small birefringence and a smooth surface; and therefore, a cellulose triacetate (hereinafter this may be referred to as TAC) film is mainly used for it. A liquid crystal display employing a polarizing plate having a cellulose triacetate film as its protective film sometimes suffers from display image unevenness. This may be due to dimensional change of the polarizing film depending on the ambient temperature and humidity fluctuation in long-term use. More specifically, the unevenness may be caused by the following reasons. When a polarizer film, formed of a PVA film, is exposed to various temperature/humidity fluctuation conditions, the PVA film may undergo significant dimensional change owing to moisture penetration and evaporation in and from it. The environment-dependent dimensional change may conduct from the PVA film to other members such as optical compensation sheet, adhesive and liquid-crystal cell, as a deformation stress, and the members may undergo change of their optical properties, which may cause light leakage. Accordingly, it is expected to reduce moisture permeability of a protective film of a polarizing plate so as to inhibit moisture penetration and evaporation in and from it, thereby improving the durability of the polarizing plate and preventing display unevenness to be caused by light leakage.

For sticking cellulose triacetate, which is to be a protective film or a retardation sheet, to a polarizing film, known is a method of hydrophylicating the surface of cellulose triacetate to be stuck to a polarizing film by alkali saponification treatment (for example, see JPA No. hei 7-151914 (e.g., paragraph [0008]), JPA No. hei 8-94838 (e.g., paragraph [0033]), JPA No. 2001-166146 (e.g., paragraph [0083]), and JPA No. 2001-188130 (e.g., paragraph [0042])).

The vinyl alcohol-based resin layer used as an alignment layer of retardation sheet is soluble in water, and therefore, its alkali saponification lowers the bonding force between the inside of the vinyl alcohol-based resin layer and the interface of the layer whereby the layer may peel off or, owing to long-term or rapid environmental change, especially temperature change, the durability of polarizing plate may worsen.

A liquid-crystal display device is usually left in use for a long period of time; and, therefore, the polarizing plate used in the device is required to have long-term durability with no trouble of appearance change such as peeling and no trouble of polarizing property deterioration even in long-term use under varying temperature/humidity conditions.

SUMMARY OF THE INVENTION

An object of the invention is to provide an optical film capable of contributing toward improvement of the durability of a polarizing plate and a retardation film.

Another object of the invention is to provide a polarizing plate having good durability in various environment (for example, free from a trouble of cracking inside the polarizing plate), and to provide a liquid-crystal display device capable of maintaining good and high-level display image quality for a long period of time.

As a result of assiduous investigations, the present inventors have found that, when at least one layer is formed on a transparent film by applying a vinyl alcohol-based resin composition comprising a titanium compound and/or a zirconium compound to a surface, then the above-mentioned problems can be solved; and on the basis of this finding, the inventors have completed the present invention.

The means for achieving the object are as follows.

[1] An optical film comprising a transparent film, and, on the film, at least one layer formed by applying a composition comprising a titanium compound and/or a zirconium compound and a vinyl alcohol-based resin to a surface.

[2] The optical film as set forth in [1], wherein the titanium compound is a titanium alkoxide.

[3] The optical film as set forth in [1], wherein the zirconium compound is a water-soluble, inorganic salt, organic salt or complex salt.

[4] The optical film as set forth in [1] or [2], wherein the composition comprises at least one selected from a hydroxycarboxylic acid, an aliphatic amine and a compound represented by following formula (I):

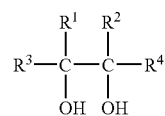

wherein $R^1$, $R^2$, $R^3$ and $R^4$ each represent a hydrogen atom, an alkyl group or a hydroxyalkyl group.)

[5] The optical film as set forth in [1] or [3], wherein the composition comprises an aminocarboxylic acid or its derivative.

[6] The optical film as set forth in any one of [1] to [5], wherein the thickness of the layer is from 0.1 μm to 10 μm.

[7] The optical film as set forth in any one of [1] to [6], wherein the vinyl alcohol-based resin is a polyvinyl alcohol derivative in which at least one hydroxyl group is substituted with a group having at least any of a vinyl moiety, an oxiranyl moiety and an aziridinyl moiety.

[8] The optical film as set forth in any one of [1] to [7], wherein the layer functions as an alignment layer.

[9] The optical film as set forth in any one of [1] to [7], wherein the layer functions as a barrier layer for reducing moisture permeability.

[10] The optical film as set forth in any one of [1] to [9], wherein at least one surface of the transparent film is subjected to an alkali-saponification treatment.

[11] The optical film as set forth in any one of [1] to [10], wherein the transparent film comprises a cellulose acylate as a major ingredient thereof.

[12] The optical film as set forth in any one of [1] to [12], wherein the transparent film comprises a saponified cellulose acylate as a major ingredient thereof.

[13] A polarizing plate comprising, at least, a polarizing film and an optical film as set forth in any one of [1] to [12].

[14] A liquid crystal display device comprising a liquid crystal cell and a polarizing plate as set forth in [13].

PREFERRED EMBODIMENT OF THE INVENTION

The invention will be described in detail below. The expression "from a lower value to an upper value" referred herein means that the range intended by the expression includes both the lower value and the upper value.

[Optical Film]

The optical film of the invention comprises a transparent film and, on the transparent film, at least one layer, referred to as "coating layer", formed by applying a vinyl alcohol-based resin composition comprising a titanium compound and/or a zirconium compound to a surface.

(Coating Layer)

For forming the coating layer, used is a vinyl alcohol-based resin composition comprising at least a titanium compound and/or a zirconium compound.

(1) Titanium Compound

According to an embodiment of the invention, the vinyl alcohol polymer composition contains a titanium alkoxide (A) and at least one compound selected from a hydroxycarboxylic acid (B), an aliphatic amine (C) and a glycol (D) represented by formula (I):

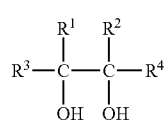

(I)

In Formula (I), $R^1$, $R^2$, $R^3$ and $R^4$ each represent a hydrogen atom, an alkyl group, or a hydroxyalkyl group.

The alkyl group or the alkyl moiety of the hydroxyalkyl group preferably has from 1 to 10 carbon atoms.

Titanium Alkoxide (A):

Titanium alkoxide (A) to be used in the invention is preferably represented by following formula (II):

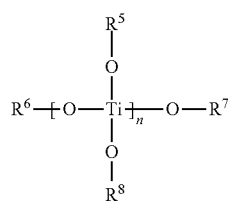

(II)

In formula (II), $R^5$, $R^6$, $R^7$ and $R^8$ each represent an alkyl group, and they may be the same or different. Preferably, the alkyl group has from 1 to 8 carbon atoms, and n indicates an integer of from 1 to 10. More concretely, examples of the compound include tetraisopropyl titanate, tetra-n-propyl titanate, tetra-n-butyl titanate, tetra-t-butyl titanate, tetraisobutyl titanate, tetraethyl titanate, tetraisooctyl titanate; mixed alkyl titanates such as diisopropyldiisooctyl titanate and isopropyl triisooctyl titanate; and tetraalkyl titanate monomer condensates such as tetra-n-butyl titanate dimer and tetra-n-butyl titanate tetramer. However, the invention should not be limited to those exemplified herein. One or more these titanium alkoxides may be used either singly or as combined.

Hydroxycarboxylic Acid (B):

The hydroxycarboxylic acid (B) is an organic compound having a hydroxyl group and a carboxyl group in the molecule, and examples of the hydroxycarboxylic acid include lactic acid, citric acid, glycolic acid, malic acid, tartaric acid, glyceric acid, hydroxypropionic acid, hydroxybutyric acid, hydroxyisobutyric acid, mandelic acid, tropic acid and gluconic acid. Needless-to-say, the invention should not be limited to those exemplified therein, but one or more these hydroxycarboxylic acids may be used either singly or as combined. Of those, more preferred are citric acid, malic acid and tartaric acid.

The amount of the hydroxycarboxylic acid (B) to be added is preferably equal to or more than 0.1 mol relative to 1 mol of the titanium alkoxide. Addition of the hydroxycarboxylic acid stabilizes the mixed liquid prepared by mixing an aqueous titanium composition and an aqueous resin, and prevents rapid reaction to give stable operability. As the amount of the hydroxycarboxylic acid increases, the titanium content in the aqueous titanium composition may lower; and, therefore, the hydroxycarboxylic acid is preferably added in a ratio of at most 20 mols.

Aliphatic Amine (C):

Examples of the aliphatic amine (C), which can be used in the invention, include alkylamines such as methylamine, ethylamine, n-propylamine, isopropylamine, n-butylamine, isobutylamine, sec-butylamine, t-butylamine, n-amylamine, sec-amylamine, dimethylamine, diethylamine, di-n-propylamine, diisopropylamine, di-n-butylamine, trimethylamine, triethylamine, tri-n-propylamine, tri-n-butylamine, 3-(diethylamino)propylamine and 3-(di-n-butylamino) propylamine; alicyclic amines such as piperidine and pyrrolidine; alkoxyalkylamines such as 3-methoxypropylamine and 3-ethoxypropylamine; hydroxyalkylamines such as N,N-dimethylethanolamine, N,N-diethylethanolamine, N,N-di-n- butylethanolamine, monoethanolamine, triethanolamine and triisopropanolamine; quaternary ammonium hydroxides such as tetramethylammonium hydroxide, tetraethylammonium hydroxide, tetra-n-propylammonium hydroxide, tetra-n-butylammonium hydroxide, trimethylbenzylammonium hydroxide and 2-hydroxyethyltrimethylammonium hydroxide. Needless-to-say, the invention should not be limited to those exemplified herein, but one or more these aliphatic amines may be used either singly or as combined.

The amount of the aliphatic amine (C) is preferably equal to or more than 0.3 mols relative to 1 mol of the titanium alkoxide. However, as the amount of the aliphatic amine increases, the titanium content in the aqueous titanium composition may lower; and therefore, the amine is preferably added in a ratio of at most 4 mols.

Glycol (D):

Example of the glycol (D) represented by above-mentioned formula (I) include 1,2-ethanediol, 1,2-propanediol, 1,2-butanediol, 1,2-pentanediol, 2,3-butanediol, 2,3-pentanediol and glycerin. However, the invention should not be limited to those exemplified herein. One or more these glycols may be used either singly or as combined.

The amount of the glycol (D) is preferably equal to or more than 1.0 mol relative to 1 mol of the titanium alkoxide. The amount is not specifically defined; however, as the amount increases, the titanium content in the aqueous titanium composition may lower, and therefore, the glycol is preferably added in a ratio of at most 6.0 mols.

The order of mixing the ingredients (A) to (D) is not specifically defined.

For example, according to an embodiment where a titanium alkoxide (A), an aliphatic amine (C) and a glycol (D) are mixed, the order of mixing the ingredients is not also specifically defined. Mixing may be carried out as follows: an aliphatic amine (C) is added to a titanium alkoxide (A), and then glycol (D) is added thereto, or a glycol (D) is added to a titanium alkoxide (A), and then an aliphatic amine (C) is added thereto.

According to an embodiment where a hydroxycarboxylic acid (B) is added, the order of mixing the ingredients is not also specifically defined. Mixing may be carried out as follows: a hydroxycarboxylic acid (B) is directly added to a titanium compound-containing solution, or a hydroxycarboxylic acid (B) is previously added to any other solution followed by mixing it with a titanium compound-containing solution.

(2) Zirconium Compound

According to another embodiment of the invention, the vinyl alcohol-based resin composition comprises a zirconium compound. The zirconium compound to be used in the invention is preferably a water-soluble zirconium compound, such as a water-soluble inorganic salt, organic salt or complex salt. Examples of the zirconium compound include basic zirconyl chloride, zirconyl oxychloride, ammonium zirconyl carbonate, zirconyl sulfate, zirconyl nitrate, zirconyl phosphate, zirconyl oxalate, zirconyl malate and zirconyl lactate; and one or more of these may be used either singly or as combined. Especially preferred is basic zirconyl chloride, as it is highly stable in a weak acidic to weak basic region and is easy to handle.

Preferably, the vinyl alcohol-based resin composition contains a chelating agent along with a zirconium compound. Preferably, a chelating agent to be used in the invention has a pH of from 1 to 7 and has the property of inhibiting the formation of precipitates; and aminocarboxylic acids or their derivatives are especially preferably used.

Aminocarboxylic Acid or Its Derivative:

An aminocarboxylic acid or its derivative favorably stabilizes the zirconium atom in the aqueous solution, and may inhibit the formation of precipitates in a weak acidic to weak basic region. An aminocarboxylic acid or its derivative to be used in the invention is preferably an amino acid or its derivative, and examples thereof include an amino acid having an amino group (—$NH_2$) and a carboxyl group (—COOH) in a molecule, and an imino acid having an imino group (—NH) in place of the amino group, such as proline and hydroxyproline. As the amino acid, generally used is an α-amino acid, but β, γ or δ-amino acids may also be used. Preferably, the amino acids have a pH of from 1 to 7; and more preferred are monoaminocarboxylic acids and monoaminodicarboxylic acids. Examples of such aminocarboxylic acid derivatives include those where 1 or 2 hydrogen atoms of the amino group are substituted, and complexes formed through chelation between the nitrogen atom of the amino group of the amino acid and the oxygen atom of the carboxyl group thereof; and the derivatives preferably have a pH of from 1 to 7.

Examples of the aminocarboxylic acid and its derivative include dihydroxymethylglycine, dihydroxyethylglycine, dihydroxypropylglycine, dihydroxybutylglycine, glycine, alanine, valine, leucine, isoleucine, serine, histidine, threonine, glycylglycine, 1-aminocyclopropanecarboxylic acid, 1-aminocyclohexanecarboxylic acid, 2-aminocyclohexanehydrocarboxylic acid; and one or more of these may be used either singly or as combined.

The ratio by mol of the zirconium compound to the chelating agent (preferably aminocarboxylic acid or its derivative) is preferably from 1/0.1 to 1/4, more preferably from 1/0.2 to 1/2.5.

In case where the molar ratio of the chelating agent is less than 0.1, then the stability in the neutral region may be low; but when it is more than 4, then the water resistance may lower.

Preferably, the zirconium compound-containing vinyl alcohol-based resin composition has a pH of from 1 to 10, as not producing precipitates.

If desired, a basic compound and an organic acid salt may be added to the zirconium compound-containing vinyl alcohol-based resin composition for the purpose of controlling the pH of the composition.

Examples of the basic compound include ammonia, sodium hydroxide, potassium hydroxide; amines such as triethylamine, tripropylamine, triethanolamine, diethanolamine, monoethanolamine, tripropanolamine, dipropanolamine, monopropanolamine, triisopropanolamine, diisopropanolamine, monoisopropanolamine, N,N-dimethylethanolamine, ethyleneimine, pyrrolidine and piperidine; and polyethyleneimine; and one or more of these may be used either singly or as combined.

Especially preferred are alcoholamines such as triethanolamine, diethanolamine, monoethanolamine, tripropanolamine, dipropanolamine, monopropanolamine, triisopropanolamine, diisopropanolamine, monoisopropanolamine and N,N-dimethylethanolamine; amines such as ethyleneimine, pyrrolidine and piperidine; and polyethyleneimine.

The organic acid salt usable herein is, for example, sodium lactate.

In case where a basic compound is added to the zirconium compound-containing vinyl alcohol-based resin composition for pH control, the ratio by mol of he zirconium compound to the basic compound is preferably 1/less than 2, more preferably 1/less than 1. In case where the molar ratio of the basic compound is 2 or more, then the water resistance may lower.

In case where an organic acid salt is added, the ratio by mol of the zirconium compound to the organic acid salt is preferably 1/less than 2, more preferably 1/less than 1, like in the case of adding a basic compound.

Preferably, the solid content of the zirconium compound is from 1 to 50 parts by mass relative to 100 parts by mass of the solid content of the vinyl alcohol-based resin, more preferably from 5 to 30 parts by mass.

When the solid content of the zirconium compound is less than 1 part by mass, then it is impracticable since the water resistance-imparting effect may lower; but when more than 50 parts by mass, then it is unfavorable from the viewpoint of the economical aspect.

(3) Vinyl Alcohol-Based Resin

The vinyl alcohol-based resin composition comprises at least one vinyl alcohol-based resin. Examples of the vinyl alcohol-based resin include homopolymers such as polyvinyl alcohol, and ethylene/vinyl alcohol copolymers. One or more these vinyl alcohol-based resins may be used either singly or as combined.

Preferably, the degree of saponification of the vinyl alcohol-based resin is equal to or more than 80 mol %; and the degree of polymerization of the vinyl alcohol-based resin is preferably from 100 to 5000 around, preferably from 200 to 4000 around, and more preferably from 200 to 3000 around in terms of reducing moisture permeability and improving coating-ability thereof.

Preferably, the vinyl alcohol-based resin is selected from polyvinyl alcohol derivatives that at least one hydroxyl group in the molecule is substituted with a polymerizing group having a vinyl moiety, an oxiranyl moiety or an aziridinyl moiety. Preferred polymers are polyvinyl alcohol derivatives represented by following formula (III) or (IV):

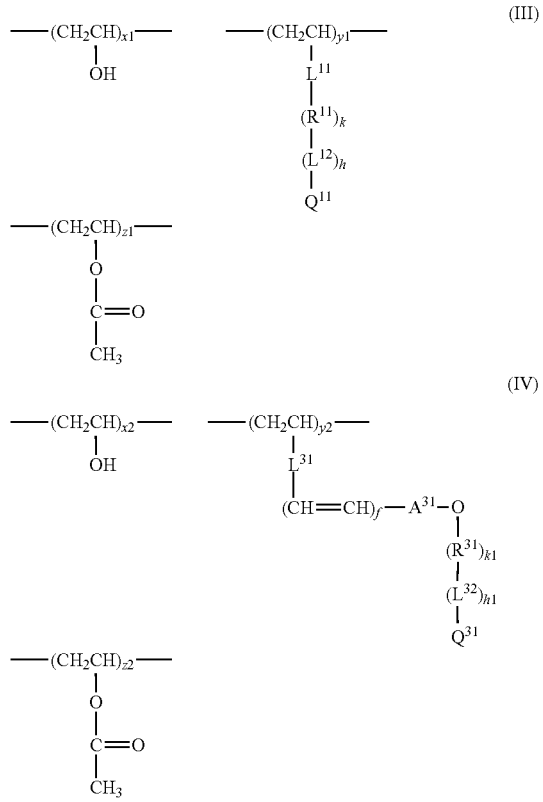

In formula (III), $L^{11}$ represents an ether bond, an urethane bond, an acetal bond or an ester bond; $R^{11}$ represents an alkylene group or an alkyleneoxy group; $L^{12}$ represents a linking group for linking $R^{11}$ and $Q^{11}$; $Q^{11}$ represents vinyl, oxiranyl or aziridinyl; x1 is from 10 to 99.9 mol %, y1 is from 0.01 to 80 mol %, and z1 is from 0 to 70 mol %, provided that the sum of x1, y1 and z1, x1+y1+z1, is 100, preferably x1 is from 80 to 99.9 mol %, y1 is from 0.01 to 5 mol %; and z1 is from 0 to 4.99 mol %; and k and h each indicate 0 or 1.

In formula (III), $R^{11}$ is preferably a $C_{1-24}$ alkylene group; a $C_{3-24}$ alkylene group in which at least one $CH_2$ group not adjacent to each other is substituted with —O—, —CO—, —NH—, —$NR^7$— ($R^7$ represents a $C_{1-4}$ alkyl group, or a $C_{6-15}$ aryl group), —S—, —$SO_2$—, or a $C_{6-15}$ arylene; or the above mentioned alkylene group having at least one selected from the group consisting of alkyl, aryl, alkoxy, aryloxy, alkylthio, arylthio, halogen, alkylcarbonyl, arylcarbonyl, alkylsulfonyl, arylsulfonyl, hydroxyl, mercapto, amino, alkylcarbonyloxy, arylcarbonyloxy, alkylsulfonyloxy, arylsulfonyloxy, alkylcarbonylthio, arylcarbonylthio, alkylsulfonylthio, arylsulfonylthio, alkylcarbonylamino, arylcarbonylamino, alkylsulfonylamino, arylsulfonylamino, carboxy and sulfo group.

$R^{11}$ is preferably —$R^2$—, —$R^3$—(O—$R^4$)$_t$—$OR^5$—, —$R^3$—CO—$R^6$—, —$R^3$—NH—$R^6$—, —$R^3$—$NR^7$—$R^6$—, —$R^3$—S—$R^6$—, —$R^3$—$SO_2$—$R^6$— or —$R^3$—$A^2$—$R^6$— (wherein $R^2$, $R^3$, $R^4$, $R^5$ and $R^6$ each represent an alkylene group having from 1 to 24 carbon atoms; $R^7$ represents an alkyl group having from 1 to 12 carbon atoms, or an aryl group having from 6 to 15 carbon atoms; $A^2$ represents an arylene group having from 6 to 24 carbon atoms; and t indicates an integer of from 0 to 4).

More preferably, $R^{11}$ is —$R^2$— or —$R^3$—(O—$CH_2$ $CH_2$)$_t$— (wherein $R^2$ and $R^3$ each represents an alkylene group having from 1 to 12 carbon atoms; and t indicates an integer of from 0 to 2); even more preferably, $R^{11}$ is an alkylene group having from 1 to 12 carbon atoms.

The alkylene group may have at least one substituent. Preferred examples of the substituent for the alkylene group include a $C_{1-24}$ alkyl group, a $C_{6-24}$ aryl group, a $C_{1-24}$ alkoxy group, a $C_{6-24}$ aryloxy group, a $C_{1-24}$ alkylthio group, a $C_{6-24}$ arylthio group, a halogen atom (F, Cl, Br), a $C_{2-24}$ alkylcarbonyl group, a $C_{7-24}$ arylcarbonyl group, a $C_{1-24}$ alkylsulfonyl group, a $C_{6-24}$ arylsulfonyl group, a hydroxyl group, a mercapto group, an amino group, a $C_{2-24}$ alkylcarbonyloxy group, a $C_{7-24}$ arylcarbonyloxy group, a $C_{1-24}$ alkylsulfonyloxy group, a $C_{6-24}$ arylsulfonyloxy group, a $C_{2-24}$ alkylcarbonylthio group, a $C_{7-24}$ arylcarbonylthio group, a $C_{1-24}$ alkylsulfonylthio group, a $C_{6-24}$ arylsulfonylthio group, a $C_{2-24}$ alkylcarbonylamino group, a $C_{7-24}$ arylcarbonylamino group, a $C_{1-24}$ alkylsulfonylamino group, a $C_{6-24}$ arylsulfonylamino group, a carboxyl group, and a sulfo group.

Preferred substituents for the alkylene group are a $C_{1-24}$ alkyl group (especially $C_{1-12}$ alkyl group), a $C_{6-24}$ aryl group (especially $C_{6-14}$ aryl group), and a $C_{2-24}$ alkoxyalkyl group (especially $C_{2-12}$ alkoxyalkyl group).

Examples of alkyl include methyl, ethyl, n-pentyl, n-hexyl, n-heptyl, n-octyl, n-nonyl, n-decyl, n-undecyl, n-dodecyl, i-propyl, i-butyl, sec-butyl, t-amyl and 2-ethylhexyl.

Examples of the alkyl group, having 1 to 4 alkoxys, include 2-methoxyethyl, 2-(2-methoxyethoxy)ethyl, 2-[2-(2-methoxyethoxy)ethoxy]ethyl, 2-n-butoxyethyl, 2-ethoxyethyl, 2-(2-ethoxyethoxy)ethyl, 3-methoxypropyl, 3-ethoxypropyl, 3-n-propyloxypropyl and 2-methylbutyloxymethyl. Examples of aryl include phenyl, 2-tolyl, 3-tolyl, 4-tolyl, 2-anisyl, 3-anisyl, 4-anisyl, 2-biphenyl, 3-biphenyl, 4-biphenyl, 2-chlorophenyl, 3-chlorophenyl, 4-chlorophenyl, 1-naphthyl and 2-naphthyl.

In formula (III), $L^{12}$ is preferably —O—, —S—, —CO—, —O—CO—, —CO—O—, —O—CO—O—, —CO—O—CO—, —NRCO—, —CONR—, —NR—, —NRCONR—, —NRCO—O— or —OCONR— (wherein R represents a hydrogen atom or a lower alkyl group).

In formula (III), —($L^{12}$)$_h$-$Q^{11}$ is preferably vinyl, vinyloxy, acryloyl, methacryloyl, crotonoyl, acryloyloxy, methacryloyloxy, crotonoyloxy, vinylphenoxy, vinylbenzoyloxy, styryl, 1,2-epoxyethyl, 1,2-epoxypropyl, 2,3-epoxypropyl, 1,2-iminoethyl, 1,2-iminopropyl or 2,3-iminopropyl.

More preferred are vinyl, vinyloxy, acryloyl, methacryloyl, acryloyloxy, methacryloyloxy, crotonoyloxy, vinylbenzoyloxy, 1,2-epoxyethyl, 1,2-epoxypropyl, 2,3-epoxypropyl, 1,2-iminoethyl, 1,2-iminopropyl and 2,3-iminopropyl. Even more preferred are acryloyl, methacryloyl, acryloyloxy and methacryloyloxy.

In formula (III), provided that the sum of x1, y1 and z1, x1+y1+z1, is 100, x1 is preferably from 50 to 99.9 mol %, and more preferably from 80 to 99.9 mol %; y1 is preferably from 0.01 to 50 mol %, and more preferably from 0.01 to 5 mol %; and z1 is preferably from 0.01 to 50 mol %, and even more preferably from 0.01 to 4.99 mol %.

In formula (III), in the embodiments where $L^{11}$ is an acetal bond, the polyvinyl alcohol of formula (III) may be represented by following formula (IIIa).

In formula (IIIa), $L^{11}$, $R^{11}$, $L^{12}$, $Q^{11}$, x1, y1, z1, k and h have the same meanings as in formula (III).

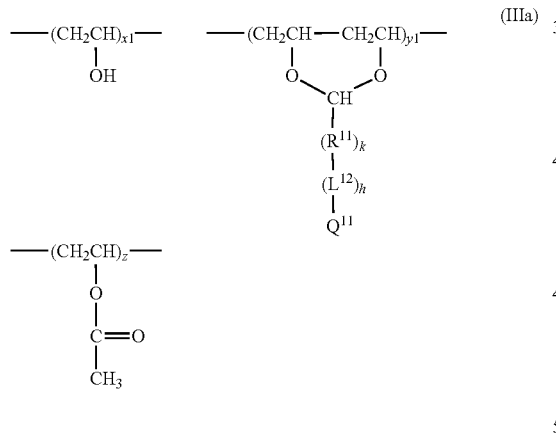

(IIIa)

In formula (IV), $L^{31}$ represents an ether bond, an urethane bond, an acetal bond or an ester bond; $A^{31}$ represents an arylene group, or a substituted arylene group having at least one halogen, alkyl, alkoxy or substituted alkoxy (examples of the substituent in the substituted alkoxy include alkoxy, aryl, halogen, vinyl, vinyloxy, acryloyl, methacryloyl, crotonoyl, acryloyloxy, methacryloyloxy, crotonoyloxy, vinylphenoxy, vinylbenzoyloxy, styryl, 1,2-epoxyethyl, 1,2-epoxypropyl, 2,3-epoxypropyl, 1,2-iminoethyl, 1,2-iminopropyl and 2,3-iminopropyl); $R^{31}$ represents the same group as that of $R^{11}$; $L^{32}$ represents the same group as that of $L^{12}$; $Q^{31}$ represents the same group as that of $Q^{11}$; provided that the sum of x2+y2+z2, x2+y2+z2, is 100, x2 is from 10 to 99.9 mol %, y2 is from 0.01 to 80 mol %, and z2 is from 0 to 70 mol %, preferably x2 is from 95 to 99.9 mol %, z2 is from 0.01 to 5 mol % and z2 is from 0 to 4.99 mol; and k1 and h1 each indicate 0 or 1.

Especially preferably, $A^{31}$ is an arylene group having from 6 to 24 carbon atoms, or halogen, or a non-substituted $C_{6-24}$ arylene group, substituted $C_{6-24}$ arylene group having at least one $C_{1-4}$ alkyl group or $C_{1-4}$ alkoxy group.

The arylene group for $A^{31}$ generally has from 6 to 24 carbon atoms, but preferably from 6 to 12 carbon atoms. Examples of the arylene group include 1,4-phenylene, 1,3-phenylene, 1,2-phenylene and 1,5-naphthylene, especially preferably 1,4-phenylene. Examples of the substituent for the arylene group include a halogen atom (F, Cl, Br or I), a $C_{1-4}$ alkyl group, a non-substituted $C_{1-4}$ alkoxy group, and a $C_{1-4}$ alkoxy group having at least one selected from the group consisting of a $C_{6-15}$ aryl, halogen atom, vinyl, vinyloxy, oxiranyl (1,2-epoxyethyl, 1,2-epoxypropyl, 2,3-epoxypropyl), aziridinyl (1,2-iminoethyl, 1,2-iminopropyl, 2,3-iminopropyl), acryloyl, methacryloyl, crotonoyl, acryloyloxy, methacryloyloxy, crotonoyloxy, vinylphenoxy, vinylbenzoyloxy and styryl. Preferred are a halogen atom, a $C_{1-4}$ alkyl group, and a $C_{1-4}$ alkoxy group. More preferred are F, Cl and methyl. Provided that the sum of x2, y2 and z2, x2+y2+z2, is 100, preferably x2 is from 50 to 99.9 mol %, y2 is from 0.01 to 50 mol %, and z2 is from 0.01 to 50 mol %; more preferably, x2 is from 5 to 99.0 mol %, y2 is from 0.01 to 5 mol %, and z2 is from 0 to 4.99 mol %.

In formula (IV), in the embodiments where $L^{31}$ is an acetal bond, the polyvinyl alcohol of formula (IV) may be represented by following formula (IVa).

In formula (IVa), $A^{31}$, $R^{31}$, $L^{32}$, $Q^{31}$, x2, y2, z2, k1 and h1 have the same meanings as in formula (IV).

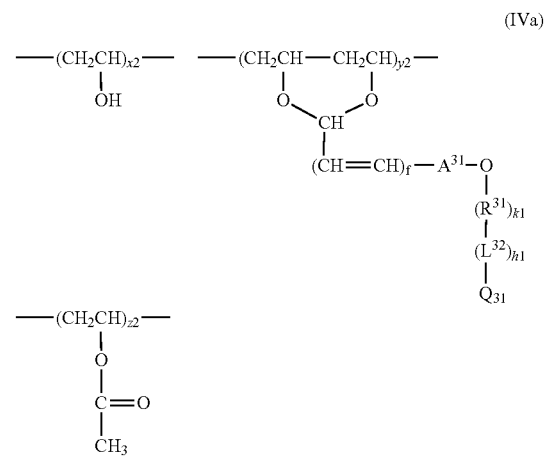

(IVa)

Specific examples of polyvinyl alcohols of formula (III) or (IV) are shown as following formulae (V-1) to (V-11).

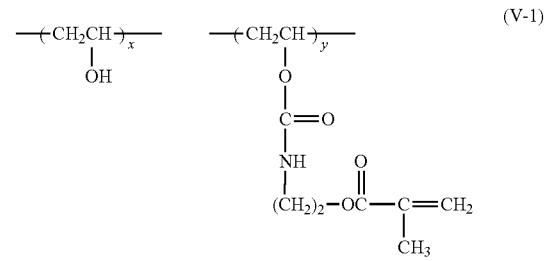

(V-1)

-continued

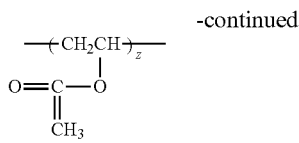

In formula (V-1), examples of x, y and z are shown below.

|  | x (mol %) | Y (mol %) | z (mol %) |
|---|---|---|---|
| Polymer 1 | 96.3 | 1.7 | 2.0 |
| Polymer 2 | 86.3 | 1.7 | 12.0 |
| Polymer 3 | 87.7 | 0.3 | 12.0 |
| Polymer 4 | 95.0 | 4.0 | 1.0 |
| Polymer 5 | 96.9 | 1.1 | 2.0 |
| Polymer 6 | 88.5 | 0.5 | 11.0 |
| Polymer 7 | 97.8 | 0.2 | 2.0 |
| Polymer 8 | 96.5 | 2.5 | 1.0 |
| Polymer 9 | 85.9 | 3.1 | 11.0 |

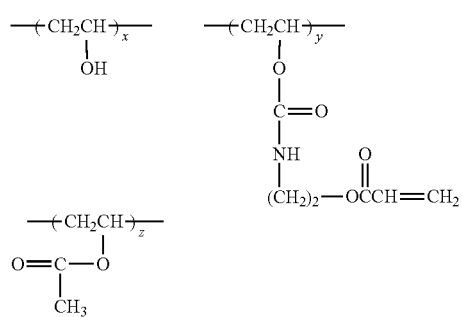 (V-2)

In formula (V-2), examples of x, y and z are shown below.

|  | x (mol %) | y (mol %) | z (mol %) |
|---|---|---|---|
| Polymer 10 | 96.3 | 1.7 | 2.0 |
| Polymer 11 | 85.7 | 0.3 | 14.0 |
| Polymer 11a | 97.7 | 0.3 | 2.0 |
| Polymer 12 | 85.0 | 3.0 | 12.0 |
| Polymer 13 | 88.0 | 1.0 | 11.0 |
| Polymer 13a | 87.0 | 1.0 | 12.0 |

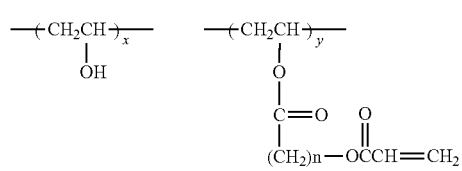 (V-3)

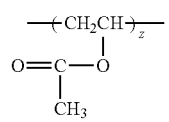

In formula (V-3), examples of n, x, y and z are shown below.

|  | n | x (mol %) | y (mol %) | z (mol %) |
|---|---|---|---|---|
| Polymer 14 | 2 | 8.0 | 1.7 | 90.3 |
| Polymer 15 | 3 | 87.5 | 0.5 | 12.0 |
| Polymer 16 | 4 | 85.0 | 4.0 | 11.0 |
| Polymer 16a | 4 | 85.0 | 3.0 | 12.0 |
| Polymer 17 | 5 | 86.9 | 1.1 | 12.0 |
| Polymer 18 | 6 | 87.7 | 0.3 | 12.0 |

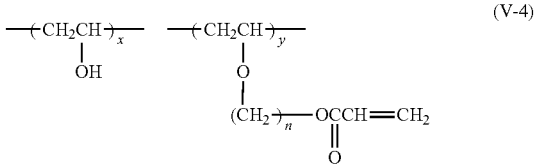 (V-4)

In formula (V-4), examples of n, x, y and z are shown below.

|  | n | x (mol %) | y (mol %) | z (mol %) |
|---|---|---|---|---|
| Polymer 19 | 2 | 97.8 | 0.2 | 2.0 |
| Polymer 20 | 2 | 97.5 | 0.5 | 2.0 |
| Polymer 21 | 3 | 95.4 | 0.6 | 4.0 |
| Polymer 21a | 3 | 97.4 | 0.6 | 2.0 |
| Polymer 22 | 4 | 96.4 | 1.6 | 2.0 |
| Polymer 23 | 5 | 96.0 | 2.0 | 2.0 |
| Polymer 23a | 5 | 96.0 | 2.0 | 2.0 |
| Polymer 24 | 6 | 95.8 | 2.2 | 2.0 |

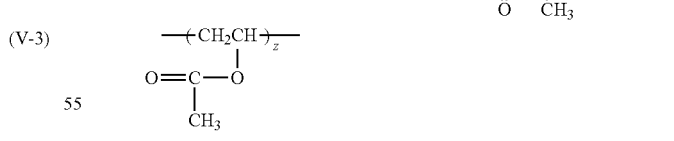 (V-5)

In formula (V-5), examples of n, x, y and z are shown below.

|  | n | x (mol %) | y (mol %) | z (mol %) |
|---|---|---|---|---|
| Polymer 25 | 2 | 97.5 | 0.5 | 2.0 |
| Polymer 26 | 3 | 97.4 | 0.6 | 2.0 |
| Polymer 26a | 3 | 96.4 | 0.6 | 3.0 |

-continued

|  | n | x (mol %) | y (mol %) | z (mol %) |
|---|---|---|---|---|
| Polymer 27 | 4 | 96.4 | 1.6 | 2.0 |
| Polymer 28 | 5 | 95.0 | 2.0 | 3.0 |
| Polymer 29 | 6 | 95.8 | 2.2 | 2.0 |

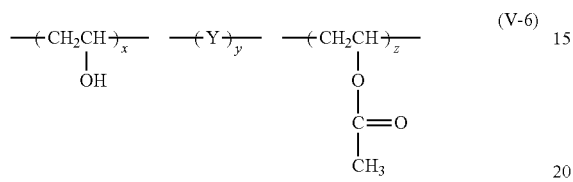
(V-6)

In formula (V-6), examples of Y, x, y and z are shown below.

|  | Y | x (mol %) | y (mol %) | z (mol %) |
|---|---|---|---|---|
| Polymer 30 | No. 30-Y | 96.3 | 1.7 | 2.0 |
| Polymer 31 | No. 31-Y | 87.3 | 1.7 | 11.0 |
| Polymer 32 | No. 32-Y | 87.4 | 0.6 | 12.0 |
| Polymer 33 | No. 33-Y | 85.8 | 1.2 | 13.0 |
| Polymer 34 | No. 34-Y | 96.3 | 1.7 | 2.0 |

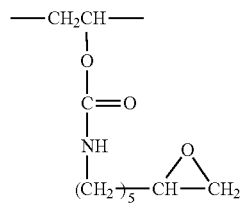
No.30-Y

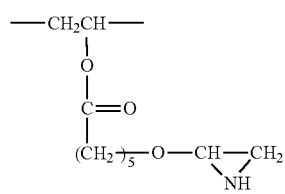
No.31-Y

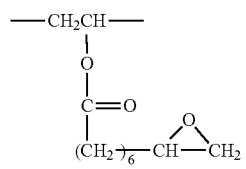
No.32-Y

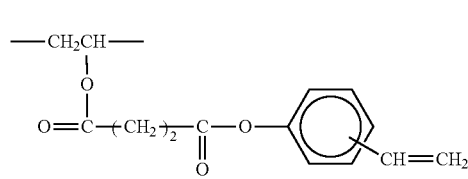
No.33-Y

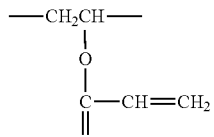
No.34-Y

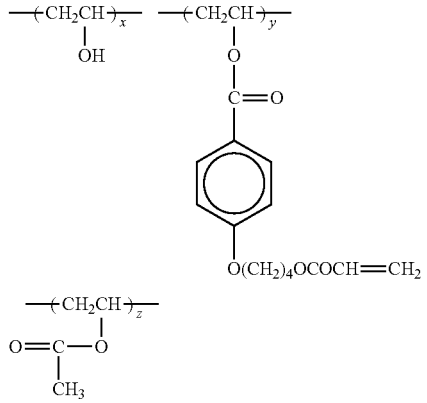
(V-7)

In formula (V-7), examples of x, y and z are shown below.

|  | x (mol %) | y (mol %) | z (mol %) |
|---|---|---|---|
| Polymer 35 | 97.8 | 0.2 | 2.0 |
| Polymer 36 | 87.7 | 0.3 | 12.0 |
| Polymer 37 | 97.86 | 0.14 | 2.0 |
| Polymer 38 | 97.94 | 0.06 | 2.0 |
| Polymer 39 | 87.2 | 0.8 | 12.0 |
| Polymer 40 | 98.5 | 0.5 | 1.0 |
| Polymer 41 | 97.8 | 0.2 | 2.0 |
| Polymer 42 | 96.5 | 2.5 | 1.0 |
| Polymer 43 | 94.9 | 4.1 | 1.0 |
| Polymer E | 97.9 | 1.1 | 1.0 |
| Polymer F | 98.0 | 1.0 | 1.0 |

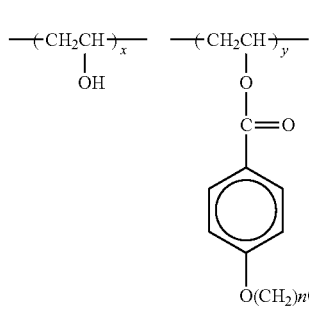
(V-8)

In formula (V-8), examples of n, x, y and z are shown below.

|  | n | x (mol %) | y (mol %) | z (mol %) |
|---|---|---|---|---|
| Polymer 44 | 3 | 97.8 | 0.2 | 2.0 |
| Polymer 45 | 5 | 97.85 | 0.15 | 2.0 |
| Polymer 46 | 6 | 97.7 | 0.3 | 2.0 |
| Polymer 47 | 8 | 97.5 | 0.5 | 2.0 |

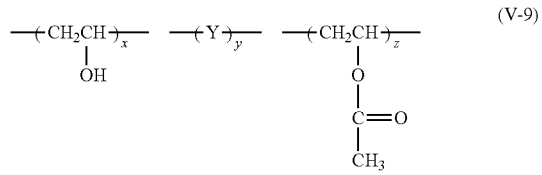

(V-9)

In formula (V-9), examples of Y, x, y and z are shown below.

|  | Y | x (mol %) | y (mol %) | z (mol %) |
|---|---|---|---|---|
| Polymer 48 | No. 48-Y | 86.2 | 1.8 | 12.0 |
| Polymer 49 | No. 49-Y | 85.2 | 0.8 | 14.0 |
| Polymer 50 | No. 50-Y | 85.9 | 3.1 | 11.0 |
| Polymer 51 | No. 51-Y | 86.5 | 2.5 | 11.0 |

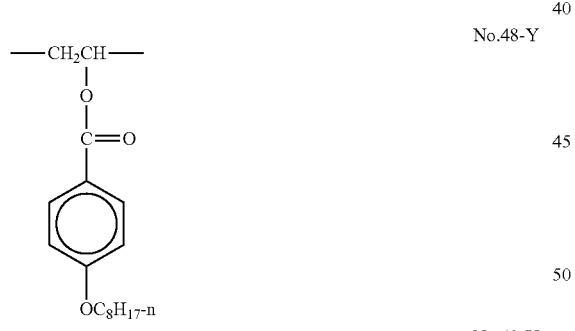

No.48-Y

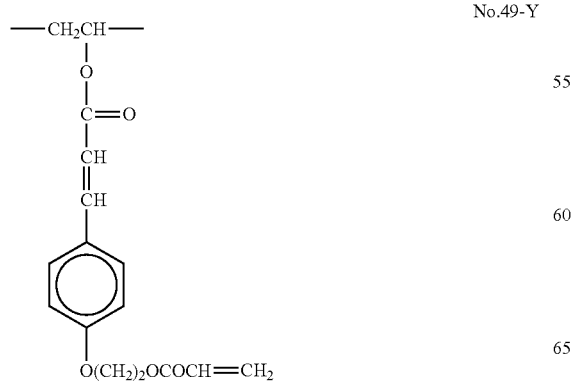

No.49-Y

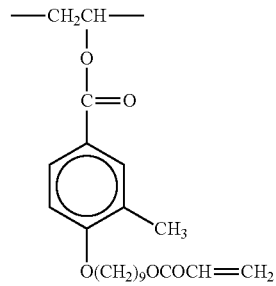

No.50-Y

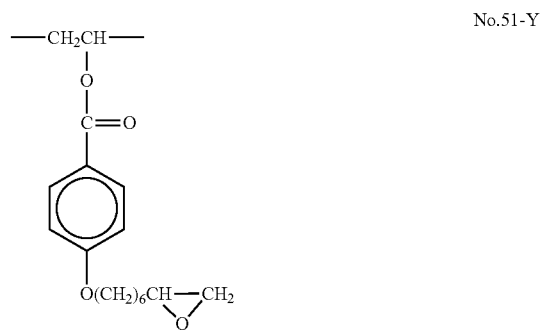

No.51-Y

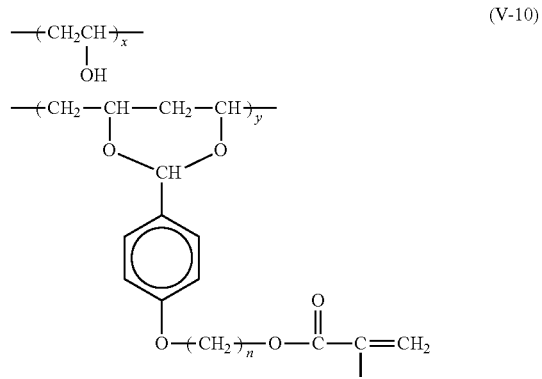

(V-10)

In formula (V-10), examples of n, x, y, z and R are shown below.

|  | n | R | x (mol %) | y (mol %) | z (mol %) |
|---|---|---|---|---|---|
| Polymer 52 | 6 | H | 96.4 | 1.6 | 2.0 |
| Polymer 53 | 4 | H | 97.2 | 0.8 | 2.0 |
| Polymer 54 | 4 | H | 95.7 | 3.3 | 1.0 |
| Polymer 55 | 5 | $CH_3$ | 95.8 | 0.2 | 4.0 |
| Polymer 56 | 9 | $CH_3$ | 95.2 | 2.8 | 2.0 |
| Polymer 57 | 3 | H | 95.0 | 4.0 | 1.0 |

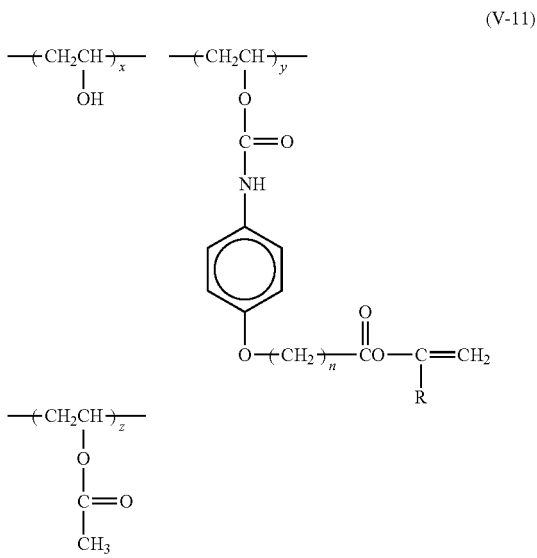

(V-11)

In formula (V-11), examples of n, x, y, z and R are shown below.

|  | n | R | x (mol %) | y (mol %) | z (mol %) |
|---|---|---|---|---|---|
| Polymer 58 | 2 | H | 87.5 | 1.5 | 11.0 |
| Polymer 59 | 4 | H | 84.5 | 0.5 | 15.0 |
| Polymer 60 | 5 | $CH_3$ | 97.8 | 0.2 | 2.0 |
| Polymer 61 | 6 | $CH_3$ | 95.5 | 4.1 | 0.4 |
| Polymer 62 | 9 | H | 97.3 | 1.7 | 1.0 |

In the vinyl alcohol-based resin composition that is a material for preparing the coating layer, the amount of the vinyl alcohol-based resin is preferably equal to or more than 30% by mass as the solid content thereof, and more preferably from 50 to 80% by mass.

Crosslinking Agent:

If desired, a crosslinking agent for vinyl alcohol-based resin may be added to the vinyl alcohol-based resin composition to be used for forming the coating layer. Accordingly, the water resistance may be further improved. The crosslinking agent usable for the object is not specifically defined, and any known crosslinking agent may be used. Examples of the crosslinking agent include phenolic resin, melamine resin, urea resin, polyamide-polyurea, dimethylolurea, dimethylolmelamine, polyepoxy compound, dialdehyde compound, polyisocyanate resin, aziridine compound, polyamidamine epichlorohydrin compound, active vinyl compound, dicarbonate compound, hydrazino group-containing compound, colloidal silica, polyvalent metal salt, boric acid, phosphoric acid, polyacrylic acid, dicarboxylic acid, adipicanhydride, andsuccinicanhydride. In addition, also usable are coupling agents such as 3-glycidopropylmethoxysilane, and radical generators such as peroxide.

Of the above-mentioned crosslinking agent, especially preferred are active vinyl compound, dicarbonate compound, colloidal silica, polyvalent metal salt, boric acid, phosphoric acid, polyacrylic acid, dicarboxylic acid, adipic anhydride and succinic anhydride as they are excellent in the balance between viscosity and adhesion strength.

The amount of the crosslinking agent to be added is preferably equal to or more tan 0.5% as (crosslinking agent/(vinyl alcohol-based resin+crosslinking agent)), more preferably equal to more than 1% by mass and particularly preferably equal to more than 2% by mass. When the ratio by mass of the crosslinking agent to the total of vinyl alcohol-based resin and the crosslinking agent is less than 0.5% by mass, then the addition of the crosslinking agent may be ineffective. Preferably, the ratio by mass of the crosslinking agent to the total of vinyl alcohol-based resin and the crosslinking agent is equal to or less tan 50% by mass, more preferably equal to or less than 40% by mass, and even more preferably equal to or less than 30% by mass. When the ratio by mass of the crosslinking agent is more than 50% by mass, then the transparency and the water resistance of the adhesive layer formed of the resin composition may lower.

Fine Particles:

Fine particles may be added to the coating layer-forming composition. Fine particles, if added thereto, are effective for improving the hardness, improving the adhesiveness to transparent film, and reducing moisture permeability.

Fine particles may be any of inorganic fine particles, organic fine particles or organic-inorganic composite fine particles. Examples of the inorganic fine particles include silicon dioxide particles, titanium dioxide particles, zirconium oxide particles, aluminium oxide particles, antimony oxide particles, and indium oxide particles.

In general, when inorganic fine particles are merely added, then they may form aggregates, or the cured coating layer may be often cracked. In the invention, for the purpose of enhancing the affinity between the inorganic particles and the organic ingredient, the surface of the inorganic particles is preferably processed with a surface modifier containing an organic segment.

The amount of the fine particles to be added is preferably from 2 to 20% by mass of the vinyl alcohol-based resin.

(4) Preparation of Coating Layer:

One example of the method for preparing the coating layer comprises preparing the vinyl alcohol-based resin composition as a coating liquid, and applying the coating liquid to a surface (for example a surface of the transparent film or a surface of any layer disposed on the transparent film) and drying it to form a coating layer. The method of preparing the coating liquid is not specifically defined, and may be suitably selected in accordance with the object. Examples of the solvent to be used for preparing the coating liquid include water, methyl alcohol, ethyl alcohol, isopropyl alcohol, n-butanol, isobutanol, and octanol; and one or more of these are preferably used either singly or as combined. Of those, more preferred is a mixture of water and an alcoholic solvent in terms of forming a foamless coating liquid.

In the embodiments where two or more of the above solvents are combined and used, preferably at least one solvent capable of dissolving a transparent film and at least one solvent not dissolving a transparent film are combined. The combined solvent of this embodiment satisfies both the requirement of preventing excessive infiltration of the ingredients of the adjacent layer to the transparent film and the requirement of securing the adhesiveness between the adjacent layer and the transparent film.

Preferably, the boiling point of at least one solvent capable of dissolving a transparent film is preferably higher than that of at least one solvent not dissolving a transparent solvent; more preferably, the difference in boiling point temperature between the solvent capable of dissolving a transparent film and having a highest boiling point and the solvent not dissolving a transparent film and having a highest boiling point is equal to or more than 30° C.; and the difference in boiling point temperature is more preferably equal to or more than 40° C.

The amount of solvent is preferably so controlled that the solid concentration in the coating liquid is from 3 to 20% by mass.

Coating may be carried out according to any coating method such as a direct gravure method, a reverse gravure method, a die coating method or an comma coating method.

In drying, the coated film is preferably heated. Heating may promote film curing, and the durability of the coating layer may be thereby improved. The preferred heating temperature varies depending on the material used, but in general, it is preferably 80° C. around, more preferably from 90 to 120° C. around.

(5) Function of Coating Layer

The coating layer may be utilized as various functional layers. Depending on its use, if desired, the vinyl alcohol-based resin composition may contain any other ingredients.

Gas Barrier Layer:

The coating layer may function as a gas barrier layer. In the embodiments where the coating layer is to have a gas barrier property, a layered inorganic compound may be dispersed in the coating layer. In the invention, the term "a layered inorganic compound" means an inorganic compound which is so constituted that the constitutive atoms are strongly bonded to each other via covalent bonding or the like to form sheets and the sheets are layered nearly in parallel to each other via weak force such as Van der Waals force or electrostatic force, and which may coordinate or absorb a solvent between the layers and may be thereby swollen or cleaved.

Examples of the inorganic compound include swellable hydrous silicates such as smectite group clay minerals (e.g., montmorillonite, beidellite, nontronite, saponite, hectorite, sauuconite, stevensite), vermiculite group clay minerals (e.g., vermiculite), kaolin-type minerals (e.g., halloysite, kaolinite, endellite, dickite), phyllosilicates (e.g., talc, pyrophyllite, mica, margarite, muscovite, phlogopite, tetrasilylic mica, teniolite), serpentine group minerals (e.g., antigorite), chlorite group minerals (e.g., chlorite, cookeite, nimite). These swellable layered inorganic compounds may be natural substances or synthetic products.

The layered inorganic compound may be subjected to an organization treatment. For the organization treatment, an onium ion-having compound may be given to a layered inorganic compound; and concretely, a layered organic compound may be processed with an organic onium ion-having organizing agent added thereto.

Not specifically defined, examples of the organic onium ion include monoalkyl primary to quaternary ammonium ions, dialkyl secondary to tertiary ammonium ions, trialkyl tertiary to quaternary ammonium ions, and tetraalkylammonium ions, in which the alkyl chain preferably has from 4 to 30 carbon atoms, more preferably from 6 to 20 carbon atoms, and even more preferably from 8 to 18 carbon atoms.

The ion having an ethylene oxide constitutive unit other than the alkyl chain may be used; and examples of such the ion include polyethylene glycol chain-having, primary to quaternary ammonium ions (monoethylene glycol, diethylene glycol, triethylene glycol, tetraethylene glycol ammonium ions), primary to quaternary ammonium ions of higher fatty acids, primary to quaternary ammonium ions of higher fatty acid esters, and primary to quaternary ammonium ions of higher alcohols. The ions may have a molecular chain of plural types of those ions. Further, also usable herein are secondary to quaternary ammonium ions prepared by adding those 1 to 4 molecular chains to fatty acid amides.

One or more these layered inorganic compounds may be used either singly or as combined.

The layered inorganic compound is preferably subjected to a microparticlulation treatment in terms of achieving both the gas barrier property and the adhesiveness between the substrate and the gas barrier layer. The swellable layered inorganic compounds subjected to a microparticlulation treatment are generally tabular or flattened, and their face morphology is not specifically defined. They may be amorphous.

The mean particle diameter of the tabular, swellable layered inorganic compound subjected to a microparticlulation treatment is, for example, preferably from 0.1 to 10 µm, more preferably from 0.5 to 8 µm, and even more preferably from 0.8 to 6 µm. When the particle diameter is smaller than 0.1 µm, then the moisture permeability-reducing effect may be insufficient; and when larger than 10 µm, then it is unfavorable as causing increase in haze and increase in surface roughness.

The mean particle diameter of the tabular particles as referred to herein means the mean value of the mean particle diameter distribution data of tabular particles, as measured with an ordinary particle diameter, for example, a light scattering-type particle sizer (Nikkiso's "Microtrack UPA").

Preferably, the concentration of the layered inorganic compound is from 2 to 20% by mass of the vinyl alcohol-based resin, more preferably from 3 to 10% by mass. When the concentration of the layered inorganic compound is less than 2% by mass, then the moisture permeability-reducing effect is insufficient; but when more than 20% by mass, then it is unfavorable as causing increase in haze and increase in brittleness.

With its layers surely cleaved, the layered inorganic compound is dispersed in a binder whereby the moisture permeation path may be prolonged and moisture permeability may be thereby reduced.

Accordingly, dispersion treatment is extremely important for suitably cleaving the constitutive layers of the layered inorganic compound.

For this, the value to be calculated by dividing the mean particle diameter of the layered inorganic compound (when the particles are tabular, this is the mean particle diameter in the surface direction of each particle) by the spacing between the adjacent sheets of the compound (this may be determined through X-ray diffractiometry) falls within a range of from 100 to 10,000, more preferably from 500 to 9,000, even more preferably from 1,000 to 8,000.

Preferably, the dispersion treatment is high-pressure dispersion treatment to be effected plural times in a solution. The treatment pressure is preferably equal to or more than 10 MPa, and more preferably equal to or more than 20 MPa. Materials subjected to a dispersion treatment are commercially available, and they may be used herein.

Not specifically defined, the solvent maybe suitably selected in accordance with the object. For the layered inorganic compound not subjected to an organization treatment, for example, usable are water or water-soluble solvents (lower alcohol such as methanol, ethanol, isopropyl alcohol; and acetone). Water is especially preferred.

For defoaming the processed system, a mixed solvent of water and a lower alcohol is also preferably used.

The method of high-pressure dispersion treatment is, for example, as follows: A swellable layered inorganic compound is swollen in a solvent, and then stirred with a high-pressure homogenizer for dispersing it under high pressure.

The method for preparing the coating liquid is not specifically defined. For example, a binder ingredient for the coating layer is uniformly dissolved in a solvent, and then this is mixed with a solvent containing layered particles uniformly dispersed therein. This method is effective for preparing the coating liquid.

After prepared, the solution is preferably filtered through a filter having a pore size larger than the maximum particle diameter of the layered inorganic compound, for removing insolubles from it.

In the embodiments where a layered inorganic compound is dispersed in a compound having low hydrophilicity, a layered inorganic compound dispersible in an organic solvent is preferably used, and a layered inorganic compound subjected to an organization treatment is more preferred.

Examples of the layered inorganic compound include layered compounds subjected to an organization treatment with an organizing agent such as alkylamine.

For the purpose of more enhancing the strength of the coating layer and for more reducing moisture permeability, it is more desirable to organize the compound with a polymerizing group-having organizing agent.

Commercially-available, organized layered inorganic compounds are Somashif MAE, MTE, MEE, MPE (all Co-op Chemical's synthetic mica), and Lucentite SAN, STN, SEN, SPN (all Co-op Chemical's synthetic smectite).

It is also desirable to organic unorganized layered inorganic compounds, for example, commercially-available Lucentite ME-100 (Co-op Chemical's synthetic mica) and Lucentite SWN (Co-op Chemical's synthetic smectite).

The organizing agent is preferably a quaternary ammonium salt. Not specifically defined, quaternary ammonium salts of following formula (3) are more preferred.

In formula (3), Ra represents $(CH_2)_mH$ or $(CH_2)_mRcH$ or $(CH_2Rc)_mH$; m indicates an integer equal to or more than 2; Rc may have any desired structure or may be absent; Rb represents $CH_3$; n indicates 0 or an integer of from 1 to 3; $A^-$ represents $Cl^-$ or $Br^-$.

(3)

In formula (3), n is preferably from 0 to 3, more preferably from 0 to 2, and even more preferably from 0 to 1. When n is too large, then it is unfavorable since the dispersibility may worsen. All Ra's may have the same structure, or they may individually have different structures.

In formula (3), m is equal to or more than 2. In at least one Ra, m is preferably equal to or more than 4, more preferably equal to or more than 8, and even more preferably from 8 to 30. Preferably, m is larger, as the dispersibility is bettered. However, when too large, it is unfavorable since the proportion of the organic substance to the layered inorganic compound may too much increase.

Preferably, Ra has a structure capable of enhancing the interaction between the molecules. The structure capable of enhancing the intermolecular interaction includes —OH, —$CH_2CH_2O$—, and —$CHO(CH)_3$—.

Examples of the quaternary ammonium salt to be used for the organization treatment include dimethyldioctadecylammonium bromide, trimethyloctadecylammonium chloride, benzyltrimethyl ammonium chloride, dimethylbenzyloctadecylammonium bromide, trioctylmethylammonium chloride, polyoxypropylene-trimethylammonium chloride, di(polyoxypropylene)dimethyl ammonium chloride, di(polyoxyethylene)dodecylmethylammonium chloride, tri(polyoxypropylene)methylammonium chloride, and tri(polyoxypropylene)methylammonium bromide.

The layered inorganic compound subjected to an organic treatment may be used in the invention as follows. A layered compound is fully dispersed in an organic solvent and then a solution of a hydrophobic binder dissolved and/or dispersed in a solvent is added thereto; or a liquid, in which an organized layered inorganic compound is dispersed, is added to a solution of a hydrophobic binder.

And, for directly adding a layered inorganic compound to a hydrophobic binder, a layered inorganic compound may be added to a melt of a hydrophobic binder and dispersed in the hydrophobic binder according to a kneading method.

Alignment Layer:

The coating layer may be used as an alignment layer for imparting desired alignment to the liquid crystal molecules of an optically-anisotropic layer. Preferably, the alignment layer is prepared by rubbing the surface of the coating layer, as the tilt angle on the side of the alignment layer is easy to control. For rubbing it, in general, the surface of the polymer layer may be rubbed a few times with paper or cloth in a predetermined direction. In the invention, preferably, the rubbing is attained according to the method described in Handbook of Liquid Crystals (by Maruzen), as demonstrated in Examples given hereinunder.

For changing the rubbing density of the alignment layer, employable is the method described in Handbook of Liquid Crystals (by Maruzen). The rubbing density (L) is quantified by the following formula (A):

(A) $L=Nl(1+2\pi rn/60 v)$, wherein N means the rubbing frequency, l means the contact length of the rubbing roller, r means the radius of the roller, n means the revolution of the roller (rpm), v means the stage moving speed (/sec).

For increasing the rubbing density, the rubbing frequency is increased, the contact length of the rubbing roller is increased, the roller radius is increased, the roller revolution is increased, and the stage moving speed is reduced; and vice versa, for reducing the rubbing density.

Thickness of Coating Layer:

Not specifically defined, the thickness of the coating layer is preferably from 0.01 to 10 μm. For use as an alignment layer, the thickness of the coating layer is preferably from 0.01 μm to less than 1.5 μm so as to be free from a problem of unevenness in liquid-crystal display devices.

On the other hand, for the purpose of gas barrier properties, the thickness is more preferably from 1.5 to 10 μm. When the thickness of the coating layer is more than 10 μm, then it is unfavorable since the coating layer may be more brittle and the drying load may increase; but when less than 1.5 μm, then it could not attain the desired moisture permeation resistance enough for a protective film for a polarizing plate and therefore could not prevent light leakage in liquid-crystal display devices in long-term use.

(Transparent Film)

Not specifically defined in point of its material, the transparent film may be any film that is transparent. Depending on its use, the film may be suitably selected, for which, for example, usable are cellulose acylate, norbornene-based polymer, polycarbonate, polystyrene, polyvinyl alcohol, polyethylene, polypropylene, and lactone ring-containing polymer. Preferred is a cellulose acylate film (in this description, a film comprising a cellulose acylate as the main ingredient (in an amount of at least 50% by mass of the solid content thereof) is referred to as "cellulose acylate film"), since it is optically uniform and has a smooth surface and since its secondary workability in producing polarizing plate is good.

Cellulose Acylate:

The cellulose acylate which can be used in the invention is preferably selected from $C_{2-22}$ aliphatic carboxylic acid esters and aromatic carboxylic acid esters, and more preferably selected from lower aliphatic carboxylic acid esters. The term "lower aliphatic carboxylic acid" is used for any $C_6$ or shorter fatty acid. Examples of the lower aliphatic carboxylic acid ester include cellulose acetate, cellulose propionate, cellulose butyrate, cellulose acetate phthalate and mixed esters, described in JPA Nos. hei 10-45804 and hei 8-231761 and U.S. Pat. No. 2,319,052, such as cellulose acetate propionate and cellulose acetate butyrate. The esters of the aromatic carboxylic acid and cellulose, described in JPA Nos. 2002-179701, 2002-265639 and 2002-265638, are also preferable. Among these, cellulose triacetate and cellulose acetate propionate, which is described in detail later, are more preferable. Mixtures of two or more types cellulose acylates may be used.

The degree of substitution in the cellulose acylate, DS, means a ratio of acylation of three hydroxys in a cellulose unit (β1→4 glycoside bonding glucose). The degree of substitution can be calculated based on the measured amount of fatty acid linking to a cellulose unit. The measurement can be carried out according to ASTM-D817-91.

The cellulose acylate, which can be used in the invention, preferably has hydrophobicity due to acyls and hydrophilicity due to hydroxys in a good balance, and thereby having humidity-dependency of retardation and dimension-stability in a good balance. More specifically, when cellulose acylate, in which the length of alkyl chain in the acyl group is too short and/or the ratio of hydroxy is too large, is used for preparing a film, the film may have a large humidity-dependency of retardation. When cellulose acylate, in which the length of alkyl chain in the acyl group is too long and/or the ratio of hydroxy is too large, is used for preparing a film, the film may have a low Tg and worsen dimension-stability. Preferred examples of cellulose acylate include cellulose acetylates having the degree of acetylation from 2.83 to 2.91 and having no $C_3$ or longer acyl group. The degree of acetylation is preferably from 2.84 to 2.89.

Other preferred examples of the cellulose acylate other than cellulose acetate include cellulose acylates having at least one $C_{2-4}$ acyl group and having X and Y, which indicate the degrees of substitution of acetyl and propionyl respectively, satisfying both of relational expressions (a) and (b).

$$2.6 \leq X+Y \leq 2.9 \quad \text{(a)}$$

$$0 \leq X \leq 2.5 \quad \text{(b)}$$

Among cellulose acylates satisfying both of relational expressions (a) and (b), any cellulose propionates, of which total degree of the acyls is the sum (X+Y) of X and Y, satisfying both of relational expressions shown below:

$$1.9 \leq X \leq 2.5 \text{ and}$$

$$0.1 \leq Y \leq 0.9$$

Hydroxys are generally presented in the moieties which are not substituted with the acyl group.

The above-mentioned cellulose acylates can be prepared according to any known method.

The thickness of the transparent film is preferably from 30 to 120 μm, and more preferably from 40 to 80 μm. When the thickness of the film is at least the above-mentioned lower limit, the film may not suffer from fragility or the like; when the thickness of the film is at most the upper limit, the film may not suffer from heaviness or the like. Heaviness is unfavorable for use in any big-screen televisions which is equal to or more than 20-inches televisions.

UV Absorbent:

The transparent film preferably contains at least two types of UV absorbents selected from the compounds represented by following formula (1):

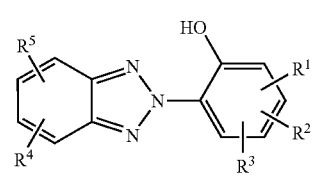

In formula (1), $R^1$, $R^2$, $R^3$, $R^4$ and $R^5$ each independently represent a hydrogen atom, or a monovalent organic group; at least one of $R^1$, $R^2$ and $R^3$ is an unsubstituted, branched or linear alkyl group having from 4 to 20 carbon atoms in total; and $R^1$, $R^2$ and $R^3$ differ from each other.

More preferred for the transparent film is a cellulose acylate film capable of satisfying following numerical formula (B) that indicates the relation between a mean value of octanol/water partition coefficient (hereinafter referred to as log P) represented by the following numerical formula (A) relative to the UV absorbent (hereinafter this is referred to as mean log P), and the degree of acylation of the cellulose acylate, DS.

In the following numerical formula (A), $W_n$ means the mass fraction of the n'th UV absorbent; and $(\log P)_n$ means "logP" of the n'th UV absorbent.

$$\text{Mean Log } P = \sum_n W_n (\log P)_n \quad \text{(A)}$$

$$5.0 \times DS - 6.7 \leq \text{mean log} P \leq 5.0 \times DS - 5.1 \quad \text{(B)}$$

The mean value of log P of the above-mentioned UV absorbents is from (5.0×DS−6.7) to (5.0×DS−5.1), preferably from (5.0×DS−6.5) to (5.0×DS−5.2). When the mean value of log P is too large, then the surface condition may worsen; but when the mean value of log P is too small, then the retainability of the UV absorbents under high-temperature and high-humidity condition may worsen.

The compounds of formula (1) have an absorption maximum in a wavelength range of from 330 to 360 nm.

Preferably, the UV absorbents have a molecular weight of from 250 to 1,000 from the viewpoint of the volatility thereof, more preferably from 260 to 800, even more preferably from 270 to 800, still more preferably from 300 to 800. Having a molecular weight falling within the range, the UV absorbents may have a specific monomer structure, or may have an oligomer structure or a polymer structure comprising plural monomer units bonding to each other.

Preferably, the UV absorbents do not evaporate away during the process of dope casting and drying in producing cellulose acylate films.

The amount of the UV absorbents to be added is preferably from 0.01 to 10% by mass of cellulose acylate, more preferably from 0.1 to 5% by mass, even more preferably from 0.2 to 3% by mass.

The time when the UV absorbents are added may be in any stage of dope preparation, or they may be added last in the dope preparation step.

The UV absorbents of formula (1) are described in detail. $R^1$, $R^2$, $R^3$, $R^4$ and $R^5$ each independently represent a hydrogen atom, or a monovalent organic group; at least one of $R^1$, $R^2$ and $R^3$ is an unsubstituted, branched or linear alkyl group having from 4 to 20 carbon atoms in total; and $R^1$, $R^2$ and $R^3$ differ from each other.

Examples of the organic group include alkyls (preferably $C_{1-20}$, more preferably $C_{1-12}$ and more preferably $C_{1-8}$ alkyls such as methyl, ethyl, iso-propyl, tert-butyl, n-octyl, n-decyl, n-hexadecyl, cyclopropyl, cyclopentyl and cyclohexyl), alkenyls (preferably $C_{2-20}$, more preferably $C_{2-12}$ and more preferably $C_{2-8}$ alkenyls such as vinyl, allyl, 2-butenyl and 3-pentenyl), alkynyls (preferably $C_{2-20}$, more preferably $C_{2-12}$ and more preferably $C_{2-8}$ alkynyls such as propargyl and 3-pentynyl), aryls (preferably $C_{6-30}$, more preferably $C_{6-20}$ and more preferably $C_{6-12}$ aryls such as phenyl, p-methyl phenyl and naphthyl) and substituted or non-substituted aminos (preferably $C_{0-20}$, more preferably $C_{0-10}$ and more preferably $C_{0-6}$ aminos such as amino, methylamino, dimethylamino, diethylamino and dibenzylamino).

Other examples of the organic group include alkoxys (preferably $C_{1-20}$, more preferably $C_{1-12}$ and more preferably $C_{1-8}$ alkyls such as methoxy, ethoxy and butoxy), aryloxys (preferably $C_{6-20}$, more preferably $C_{6-16}$ and more preferably $C_{6-12}$ aryloxys such as phenyloxy and 2-naphthyloxy), acyls (preferably $C_{1-20}$, more preferably $C_{1-12}$ and more preferably $C_{1-8}$ acyls such as acetyl, benzoyl, formyl and pivaloyl), alkoxycarbonyls (preferably $C_{2-20}$, more preferably $C_{2-16}$ and more preferably $C_{2-12}$ alkoxycarbonyls such as methoxycarbonyl and ethoxycarbonyl), aryloxycarbonyls (preferably $C_{7-20}$, more preferably $C_{7-16}$ and more preferably $C_{7-10}$ aryloxycarbonyls such as phenyloxycarbonyl), acyloxys (preferably $C_{2-20}$, more preferably $C_{2-16}$ and more preferably $C_{2-10}$ acyloxys such as acetoxy and benzoyloxy), acylaminos (preferably $C_{2-20}$, more preferably $C_{2-16}$ and more preferably $C_{2-10}$ acylaminos such as acetylamino and benzoylamino), alkoxycarbonylaminos (preferably $C_{2-20}$, more preferably $C_{2-16}$ and more preferably $C_{2-12}$ alkoxycarbonylaminos such as methoxycarbonylamino), aryloxycarbonylaminos (preferably $C_{7-20}$, more preferably $C_{7-16}$ and more preferably $C_{7-12}$ aryloxycarbonylaminos such as phenyloxycarbonylamino), sulfonylaminos (preferably $C_{1-20}$, more preferably $C_{1-16}$ and more preferably $C_{1-12}$ sulfonylaminos such as methane sulfonylamino and benzene sulfonylamino), sulfamoyls (preferably $C_{0-20}$, more preferably $C_{0-16}$ and more preferably $C_{0-12}$ sulfamoyls such as sulfamoyl, methylsulfamoyl, dimethylsulfamoyl and phenylsulfamoyl), carbamoyls (preferably $C_{1-20}$, more preferably $C_{1-16}$ and more preferably $C_{1-12}$ carbamoyls such as carbamoyl, methylcarbamoyl, diethtylcarbamoyl and phenylcarbamoyl), alkylthios (preferably $C_{1-20}$, more preferably $C_{1-16}$ and more preferably $C_{1-12}$ alkylthios such as methylthio and ethylthio), arylthios (preferably $C_{6-20}$, more preferably $C_{6-16}$ and more preferably $C_{6-12}$ arylthios such as phenylthio), sulfonyls (preferably $C_{1-20}$, more preferably $C_{1-16}$ and more preferably $C_{1-12}$ sulfonyls such as mesyl and tosyl), sulfinyls (preferably $C_{1-20}$, more preferably $C_{1-16}$ and more preferably $C_{1-12}$ sulfinyls such as methane sulfinyl and benzene sulfinyl), ureidos (preferably $C_{1-20}$, more preferably $C_{1-16}$ and more preferably $C_{1-12}$ ureidos such as ureido, methyl ureido and phenyl ureido), amide phosphates (preferably $C_{1-20}$, more preferably $C_{1-16}$ and more preferably $C_{1-12}$ amide phosphates such as diethylphosphoramide and phenylphosphoramide), hodroxy, mercapto, halogen atoms (such as fluorine, chlorine, bromine and iodine atoms), cyano, sulfo, carboxyl, nitro, hydroxamic acid group, sulfino, hydrazino, imino, heterocyclic group (preferably $C_{1-30}$ and more preferably $C_{1-12}$ heterocyclic group, in which at least one hetero atom such as nitrogen, oxygen or sulfur atom is embedded, such as imidazolyl, pyridyl, quinolyl, furyl, piperidyl, morpholino, benzoxazolyl, benzoimidazolyl and benzothiazolyl) and silyls (preferably $C_{3-40}$, more preferably $C_{3-30}$ and more preferably $C_{3-24}$ silyls such as trimethyl silyl and triphenyl silyl) These organic group may have at least one substituent selected therefrom.

When the compound has two or more organic groups, they may be same with or different from each other, and if possible, they may bond to each other to form a ring. In formula (I), at least one of $R^1$, $R^2$ and $R^3$ is a non-substituted $C_{4-20}$ branched or linear alkyl, and $R^1$, $R^2$ and $R^3$ are different from each other.

Preferably, two of $R^1$, $R^2$ and $R^3$, for example $R^1$ and $R^3$, each represent a hydrogen atom, a substituted or non-substituted alkyl group, a substituted or non-substituted alkenyl group, a substituted or non-substituted alkynyl group, a substituted or non-substituted aryl group, a substituted or non-substituted amino group, a substituted or non-substituted alkoxy group, a substituted or non-substituted aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably an alkyl group having from 1 to 12 carbon atoms (preferably from 4 to 12 carbon atoms).

Preferably, one of $R^1$, $R^2$ and $R^3$, for example $R^2$, is a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, or a halogen atom; even more preferably a hydrogen atom, or an alkyl group having from 1 to 12 carbon atoms; still more preferably a hydrogen atom, or a methyl group; most preferably a hydrogen atom.

Preferably, $R^4$ and $R^5$ each are a hydrogen atom, a substituted or non-substituted alkyl group, a substituted or non-substituted alkenyl group, a substituted or non-substituted alkynyl group, a substituted or non-substituted aryl group, a substituted or non-substituted amino group, a substituted or non-substituted alkoxy group, a substituted or non-substituted aryloxy group, a hydroxyl group, or a halogen atom; more preferably a hydrogen atom, an alkyl group, an aryl group, an alkyloxy group, an aryloxy group, or a halogen atom; even more preferably a hydrogen atom, or a halogen atom; still more preferably a hydrogen atom, or a chlorine atom.

Specific examples of UV absorbents of formula (1) include however, are not limited to, those shown below.

UV-1 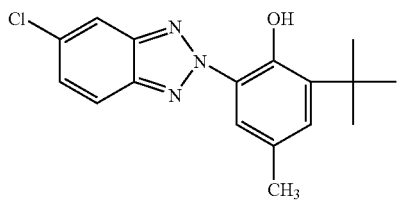

UV-2 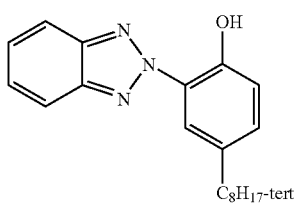

UV-3 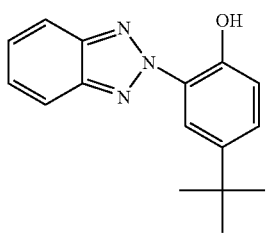

UV-4 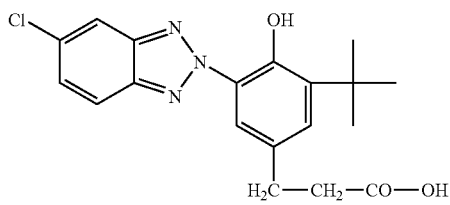

UV-5 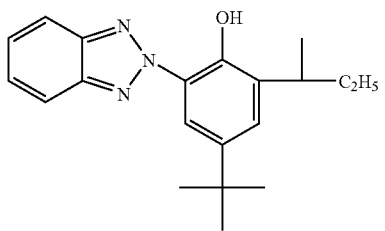

UV-6

UV-7 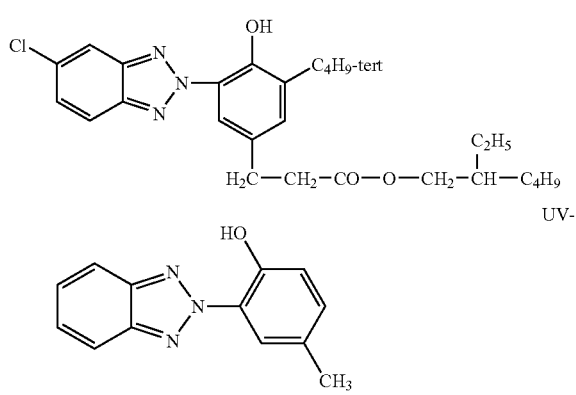

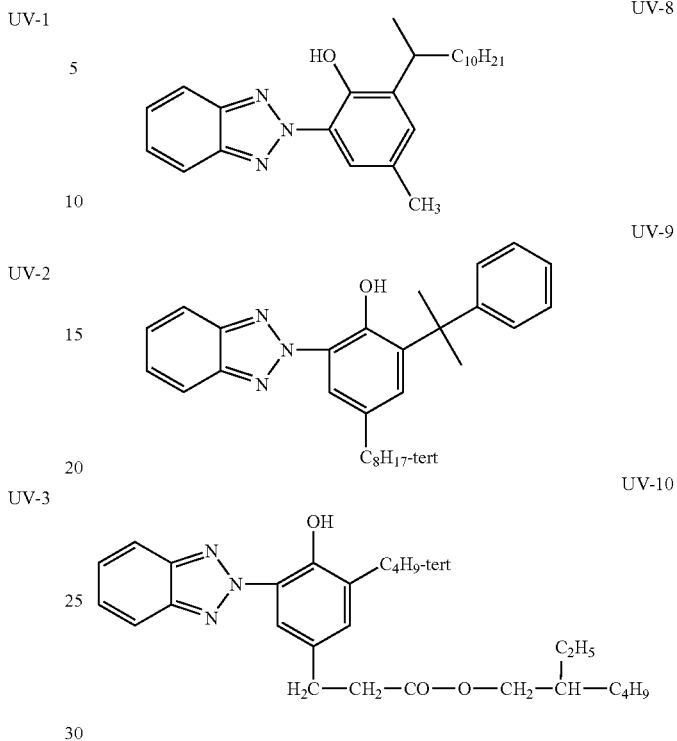

UV-8

UV-9

UV-10

Plasticizer:

A plasticizer may be added to the transparent film. Examples of the plasticizer include polyalcohol ester plasticizers, glycolate plasticizers, phosphate plasticizers, and phthalate plasticizers; and especially preferred are polyalcohol plasticizers and glycolate plasticizers. It is to be noted that the amount of the phosphate plasticizer to be added is preferably equal to or smaller than 16% by mass of the film, more preferably equal to or smaller than 10% by mass, and even more preferably equal to or smaller than 6% by mass.

The polyalcohol ester is an ester of polyhydric alcohol having two or more hydroxyls and a monocarboxylic acid, and preferably has an aromatic ring or a cycloalkyl ring in the molecule.

The polyalcohol is represented by following formula (2).

In formula (2), $R^1$ represents an n-valent organic group; n indicated a positive integer of at least 2; the OH group is an alcoholic and/or phenolic hydroxyl group.

$$R^1\text{--(OH)}_n \qquad (2)$$

Examples of the polyalcohol of formula (2) include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol.

Of those, especially preferred are triethylene glycol, tetraethylene glycol, dipropylene glycol, tripropylene glycol, sorbitol, trimethylolpropane, and xylitol.

The monocarboxylic acid for use in the polyalcohol ester is not specifically defined, for which are employable any known aliphatic monocarboxylic acids, alicyclic monocarboxylic acids and aromatic monocarboxylic acids. Using alicyclic monocarboxylic acids and aromatic monocarboxylic acids are favorable as improving the moisture permeation resistance and the retainability.

Preferred examples of the monocarboxylic acid include linear or branched fatty acids having from 1 to 32 carbon atoms, more preferably from 1 to 20 carbon atoms, even more preferably from 1 to 10 carbon atoms. Acetic acid is preferred as increasing the compatibility with cellulose ester; and a mixture of acetic acid with any other monocarboxylic acid is also preferred.

Preferred aliphatic monocarboxylic acids are saturated fatty acids such as acetic acid, propionic acid, butyric acid, valeric acid, caproic acid, enanthic acid, caprylic acid, pelargonic acid, caprylic acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachidic acid, behenic acid, lignoceric acid, cerotic acid, heptacosanoic acid, montanic acid, melissic acid, and lacceric acid; and unsaturated fatty acids such as undecylic acid, oleic acid, sorbic acid, linolic acid, linolenic acid, and arachidonic acid.

Preferred examples of the alicyclic monocarboxylic acids include cyclopentanecarboxylic acid, cyclohexanecarboxylic acid, cyclooctanecarboxylic acid, and their derivatives.

Preferred examples of the aromatic monocarboxylic acids include benzoic acid, those derived from benzoic acid by introducing an alkyl group into the benzene ring of the acid, such as toluic acid; aromatic monocarboxylic acids having at least two benzene rings such as biphenylcarboxylic acid, naphthalenecarboxylic acid, and tetralincarboxylic acid; and their derivatives. Especially preferred is benzoic acid.

Not specifically defined, the molecular weight of the polyalcohol ester is preferably from 300 to 1,500, more preferably from 350 to 750. Preferably, the ester has a larger molecular weight, as it is more hardly volatile; but in terms of moisture permeability and compatibility with cellulose acylate, the molecular weight is preferably smaller.

One or more different types of carboxylic acids may be used in the polyalcohol ester either singly or as combined. All the OH groups in the polyalcohol may be esterified, or a part of them may remain as OH.

Specific examples of polyalcohol esters usable herein are shown below.

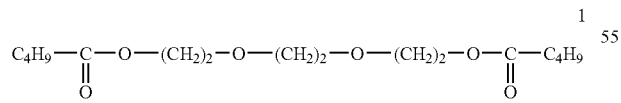
1

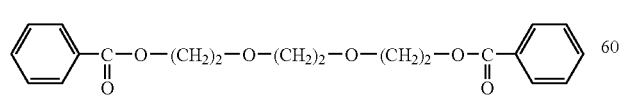
2

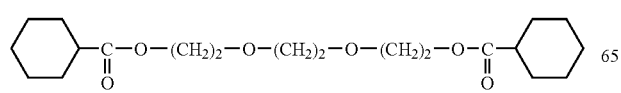
3

-continued

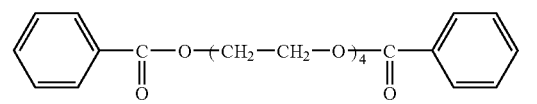
4

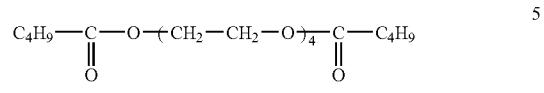
5

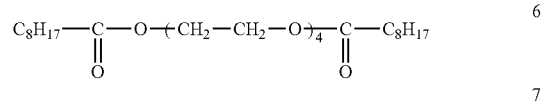
6

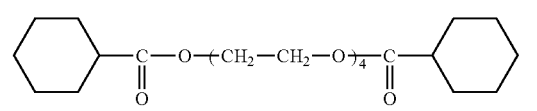
7

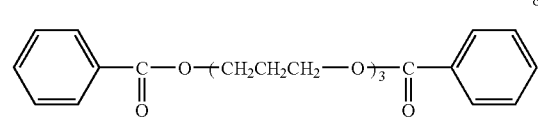
8

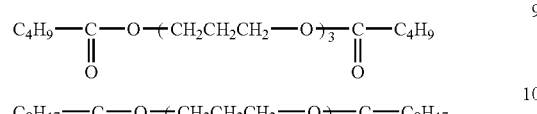
9

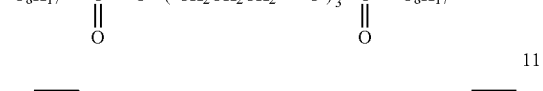
10

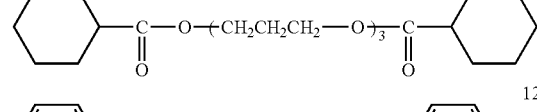
11

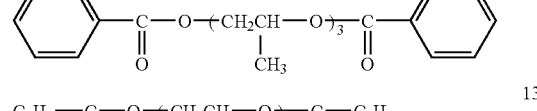
12

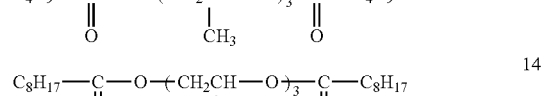
13

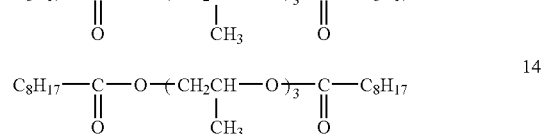
14

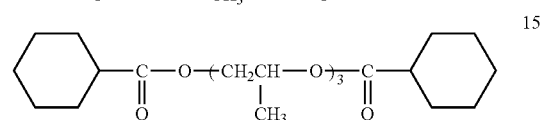
15

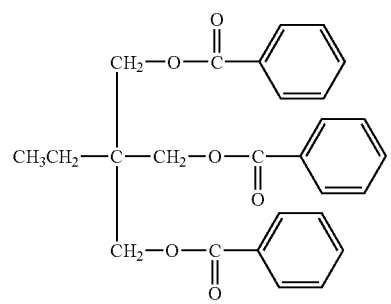
16

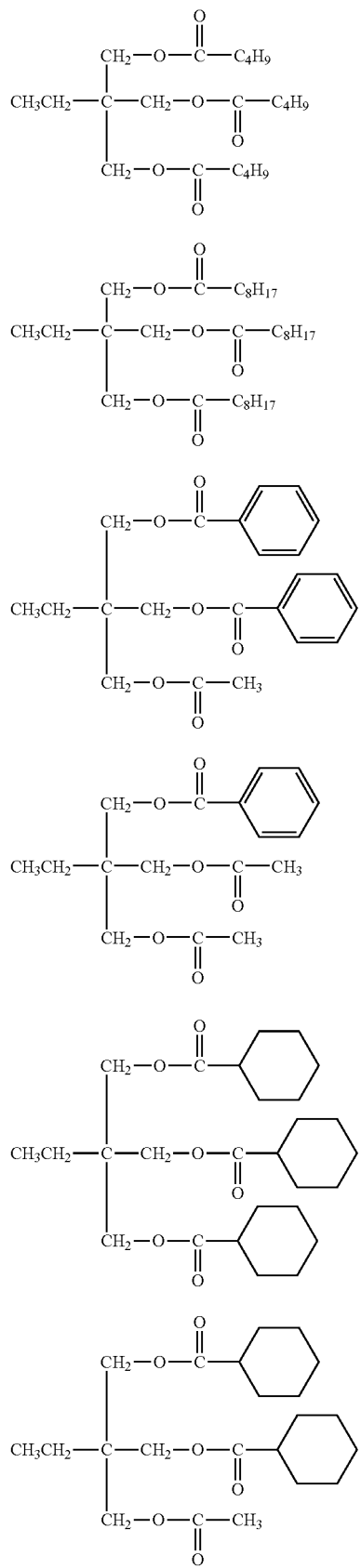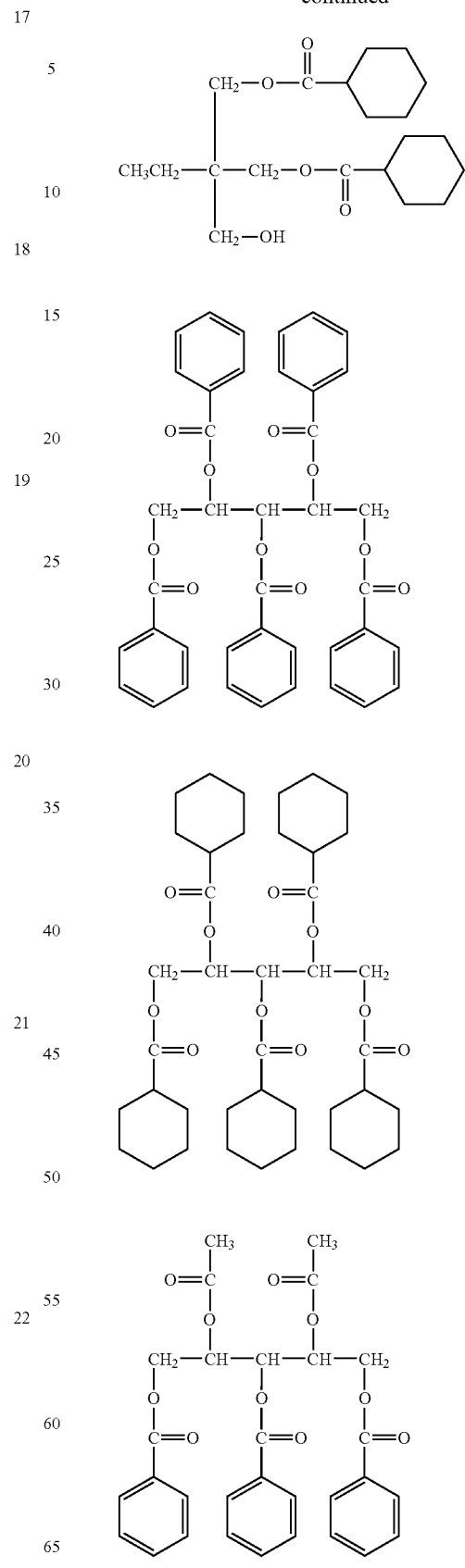

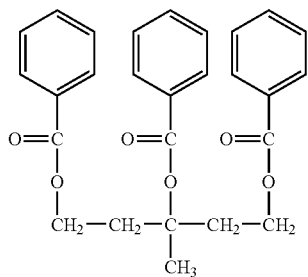

27

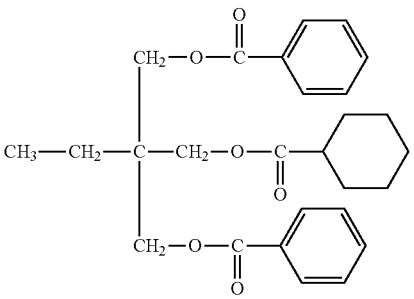

32

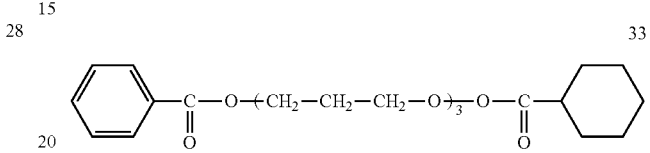

33

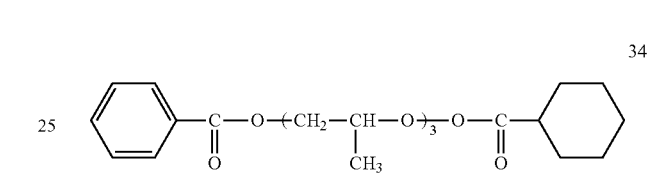

34

28

29

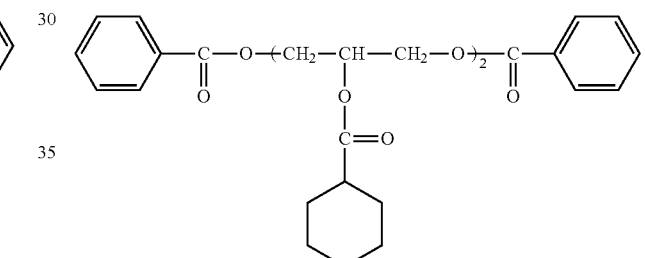

35

30

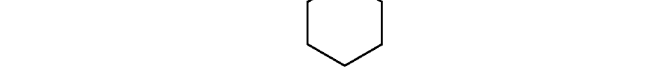

31

Various types of glycolate plasticizers may be used. Preferred for use herein are glycolate-type plasticizers having an aromatic ring or a cycloalkyl ring in the molecule.

Preferred examples of the glycolate plasticizer include butylphthalylbutyl glycolate, ethylphthalylethyl glycolate, and methylphthalylethyl glycolate.

As phosphate plasticizers, herein usable are triphenyl phosphate, tricresyl phosphate, cresyldiphenyl phosphate, octyldiphenyl phosphate, diphenylbiphenyl phosphate, trioctyl phosphate, and tributyl phosphate; as phthalate plasticizers, usable are diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butylphthalylbutyl glycolate, ethylphthalylethyl glycolate, and methylphthalylethyl glycolate; and as citrate plasticizers, usable are triethyl citrate, tri-n-butyl citrate, acetyltriethyl citrate, acetyl-tri-n-butyl citrate, and acetyl-tri-n-(2-ethylhexyl) citrate.

One or more these plasticizers may be used either singly or as combined. The amount of the plasticizer to be used is preferably from 4 to 20% by mass of the polymer that is to be the main starting material of cellulose acylate, more preferably from 6 to 16% by mass, even more preferably from 8 to 13% by mass. When the amount of the plasticizer added is too large, then the film may be too soft and its wet elasticity may lower; but when too small, moisture permeability of the film may reduced.

Other Additives:

Apart from the above-mentioned plasticizer, other various additives may be added to the transparent film for the purpose of controlling the durability and moisture permeability of the film, and controlling the physical properties such as the elasticity and the optical properties of the film. For example, usable are compounds described in JPA No. 2006-30937, paragraphs [0054] to [0134]; JPA Nos. 2003-12859 and 2002-20410; JPA No. 2003-222723, paragraphs [0031] to [0044]; and JPA No. 2002-22956, paragraphs [0045] to [0058].

(Adhesiveness between Transparent Film and Coating Layer)

Adhesiveness between the transparent film and the coating layer is noted. For improving the adhesiveness, preferably, an undercoat layer to be mentioned below is formed on the transparent film and then a coating layer is formed on it. More preferably, one or both surfaces of the transparent film are pre-treated for hydrophilication or roughening. The pretreatment may improve the adhesiveness without increasing the number of the layers to be formed on the transparent film and causing problems of producibility reduction, cost increase and layer thickness increase.

Examples of the pretreatment include a corona discharge treatment, glow discharge treatment, chromate treatment (wet treatment), saponification (wet treatment), flame treatment, hot air treatment, and ozone/UV ray irradiation. Especially preferred are a corona discharge treatment, glow discharge treatment, and saponification (wet treatment); and even more preferred is saponification.

(Physical Properties of Optical Films)

Haze:

Preferably, the haze of the optical film of the invention is equal to or less than 1.5%, more preferably equal to or less than 1.2%, and even more preferably equal to or less than 1.0%.

Color:

Preferably, the optical film of the invention is substantially colorless. "Substantially colorless" means that the absolute value of a* and b*, as expressed in an L*,a*,b* color system, is equal to or less than 3.0 each. The absolute value is more preferably equal to or less than 2.5, and even more preferably equal to or less than 2. The substantially colorless optical film is favorably used as a protective film for a polarizing plate, since the liquid--crystal display device comprising the polarizing plate may have a neutral gray panel that does not brings about any trouble in displaying color images.

(Other Functional Layers)

Depending on its use and if desired, the optical film of the invention may have any other functional layers.

Hard Coat Layer:

Preferably, a hard coat layer (having a hard coatability) is formed on one surface of the transparent film for increasing the physical strength of the film.

More preferably, a low refractivity layer is formed on the hard coat layer; and also preferably a middle refractivity layer and a high refractivity layer are formed between the hard coat layer and the low refractivity layer to constitute an antireflection film. The hard coat layer may be a laminate of two or more layers.

Preferably, the refractive index of the hard coat layer is from 1.48 to 2.00 from the viewpoint of optical planning to constitute an antireflective film, more preferably from 1.49 to 1.90, even more preferably from 1.50 to 1.80.

In the invention, at least one low refractivity layer is formed on the hard coat layer; and therefore when the refractive index of the hard coat layer is smaller than the range, then the antireflection property of the film may lower; but when too large, the color intensity of the reflected light may increase.

Preferably, the thickness of the hard coat layer is from 0.5 µm to 50 µm or so from the viewpoint of imparting sufficient durability and impact resistance to the film, more preferably from 1 to 20 µm, even more preferably from 2 to 15 µm, still more preferably from 3 to 10 µm.

Preferably, the strength of the hard coat layer is equal to or more than 2 H in a pencil hardness test, more preferably equal to or more than 3 H, and even more preferably equal to or more than 4 H.

In particular, in the Taber test according to JIS K5400, the degree of abrasion of the test piece before and after the test is preferably as small as possible.

Preferably, the hard coat layer is formed through crosslinking or polymerization of an ionizing radiation-curable compound. For example, a coating composition that contains an ionizing radiation-curable polyfunctional monomer or oligomer is applied onto a transparent film, and the polyfunctional monomer or oligomer is crosslinked or polymerized to form a hard coat layer.

The functional group in the ionizing radiation-curable polyfunctional monomer or oligomer is preferably one polymerizable by light, electron beam or radiation; and more preferred is a photopolymerizable functional group.

Examples of the photopolymerizable functional group include unsaturated polymerizable functional groups such as (meth)acryloyl group, vinyl group, styryl group, and allyl group; and above all, preferred is (meth)acryloyl group.

Preferably, the monomer or oligomer having an unsaturated polymerizable functional group such as (meth)acryloyl group, vinyl group, styryl group or allyl group in the hard coat layer polymerizes with a vinyl alcohol-base resin having a vinyl moiety, an oxiranyl moiety or an aziridinyl moiety in the layer that contains the vinyl alcohol-based resin and a layered inorganic compound having a mean particle diameter of from 0.1 to 10 µm, whereby the resulting polymer chemically bonds to the interface of the layers.

In place of or in addition to the above-mentioned, polymerizable unsaturated group-having monomer, a crosslinkable functional group may be introduced into the binder.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group.

In addition, vinylsulfonic acids, acid anhydrides, cyanoacrylate derivatives, melamines, etherified methylols, esters, urethanes, and metal alkoxides such as tetramethoxysilane are also usable as a crosslinking structure-having monomer.

Also usable is a functional group that may be crosslinkable as a result of decomposition, such as a blocked isocyanate group.

Specifically, the crosslinkable functional group in the invention may not be reactive directly as it is but may be reactive as a result of decomposition.

The crosslinkable functional group-having binder may form, after applied onto a substrate and heated thereon, a crosslinking structure.

The hard coat layer may contain mat particles having a mean particle diameter of from 1.0 to 10.0 µm, preferably from 1.5 to 7.0 µm, for example, inorganic compound particles or resin particles, for the purpose of imparting internal scatterability thereto.

To the binder of the hard coat layer, a high-refractivity monomer or inorganic particles, or both of the two may be added for the purpose of controlling the refractive index of the hard coat layer. The inorganic particles have, in addition to the effect of controlling the refractive index of the layer, an effect of preventing the layer from shrink by curing through crosslinking reaction. The term "binder" means a composition comprising the polymer formed through polymerization of the polyfunctional monomer and/or the high-refractivity monomer, and the inorganic particles dispersed therein.

The haze of the hard coat layer differs depending on the function given to the antireflection film.

In the embodiments where the hard coat layer is not given a light-scattering function inside it and in the surface thereof with maintaining the image sharpness and retarding the surface reflectivity, the haze is preferably lower, and concretely, it is preferably at most 10%, more preferably at most 5%, even more preferably at most 2%.

On the other hand, in the embodiments where the hard coat layer is given an antiglaring function owing to its surface scattering, in addition to its function of lowering the surface reflectivity, the surface haze is preferably from 5% to 15%, more preferably from 5% to 10%.

In the embodiments where the hard coat layer contributes to improving the viewing-angle properties, the internal haze of the layer (a value obtained by subtracting the surface haze from the whole haze) is preferably from 10% to 90%, more preferably from 15% to 70%, even more preferably from 20% to 50%.

For the purpose of keeping image sharpness and for attaining a smooth surface, the surface roughness profile of the hard coat layer is preferably as follows: Of the properties of the layer indicating the surface roughness thereof, for example, the center line mean roughness (Ra) is preferably equal to or less than 0.10 µm, more preferably equal to or less than 0.09 µm, and even more preferably equal to or less than 0.08 µm.

The surface roughness of the film is governed by the surface roughness of the hard coat layer; and by controlling the center line mean roughness of the hard coat layer, the center line mean roughness of the antireflection film may be made to fall within the above range.

For the purpose of keeping image sharpness, it is desirable to control the transmitted image sharpness in addition to controlling the surface roughness profile. The transmitted image sharpness of a clear antireflection film is preferably equal to or more than 60%.

The transmitted image sharpness is generally an index that indicates the degree of blurriness of the image having transmitted through a film; and a film having a larger value of the transmitted image sharpness may transmit a sharper image through it. Preferably, the transmitted image sharpness is equal to or more than 70%, and more preferably equal to or more than 80%.

In the embodiments where the optical film of the invention is disposed at the image-displaying side of a liquid-crystal display device, the reflected images of neighboring objects may be seen on the image-displaying surface, thereby lowering-the visibility of display images; and for preventing this problem, preferably, the surface of the hard coat layer is roughened to as to make it have a function of scattering light on its surface (antiglaring property).

The hard coat layer is preferably a light-scattering layer given a function of light scatterability in its surface and/or inside it (the hard coat layer given a function of light scatterability in its surface may be referred to as an antiglare layer).

Antiglare Layer:

The optical film of the invention may comprise an antiglare layer.

The antiglare layer is disposed for the purpose of making the film have an antiglare property owing to the surface scatterability thereof, and preferably for the purpose of making the film have a hard coat property so as to improve the scratch resistance of the film. Accordingly, the antiglare layer may function also as a hard coat layer.

For making a film have an antiglare property, known are a method of laminating the film with a mat shaped film having a fine roughness on its surface, as in JPA No. hei 6-16851; a method of forming the film through curing shrinkage of an ionizing radiation-curable resin based on the difference in the ionizing radiation dose, as in JPA No. 2000-206317; a method of roughening a coating film surface by gelling and solidifying light-transmitting fine particles and a light-transmitting resin based on a phenomenon that the ratio by mass of a good solvent for the light-transmitting resin reduces by drying, as in JPA No. 2000-338310; a method of giving a surface roughness to a film owing to an external pressure applied thereto, as in JPA No.2000-275404; and a method of forming a surface roughness by utilizing phase separation in a process of evaporating a solvent from a mixed solution of plural polymers, as in JPA No. 2005-195819; and any of these known methods may be utilized herein.

One preferred embodiment of the antiglare layer is a layer formed of a composition comprising a binder capable of giving a hard coat property, light-transmitting particles capable of giving an antiglare property and a solvent as indispensable ingredients, in which the projections of the light-transmitting particles themselves or the projections of aggregates of a plurality of those particles form a surface roughness of the layer. Preferably, the antiglare layer has both an antiglare property and a hard coat property.

Preferred examples of the light-transmitting particles include inorganic compound particles such as silica particles and $TiO_2$ particles; and polymer particles such as acrylic particles, crosslinked acrylic particles, polystyrene particles, crosslinked styrene particles, melamine resin particles and benzoguanamine resin particles. Of those, more preferred are crosslinked styrene particles, crosslinked acrylic particles and silica particles. Regarding their shape, the mat particles may be any of spherical or amorphous particles.

Two or more different types of mat particles having a different particle diameter may be used as combined. Mat particles having a larger particle diameter may give an antiglare property and mat particles having a smaller particle diameter may give some other optical properties. For example, in case where an antiglare antireflection film is stuck to a high-definition display panel of at least 133 ppi, the device may have a problem of display image quality failure referred to as "glaring".

"Glaring" is caused by pixel expansion or reduction owing to the roughness existing in the surface of the antiglare antireflection film whereby it loses the brightness uniformity. When other mat particles having a smaller particle diameter than that of the antiglare mat particles and having a refractive index different from that of the binder are added to the antiglare antireflection film, then the film may be free from the problem of glaring.

Preferably, the mat particles to be in the formed antiglare hard coat layer is in an amount of from 10 to 1,000 $mg/m^2$, more preferably from 100 to 700 $mg/m^2$.

Preferably, the thickness of the antiglare layer is from 1 to 20 μm, more preferably from 2 to 10 μm. Having a thickness that falls within the range, the antiglare layer may satisfy the hard coat property and curling resistance and may not be brittle.

On the other hand, the center line mean roughness (Ra) of the antiglare layer is preferably within a range of from 0.09 to 0.40 μm. When the roughness is more than 0.40 μm, then the layer may have problems of glaring and surface whitening in external light reflection thereon. Preferably, the transmitted image sharpness is from 5 to 60%.

Preferably, the strength of the antiglare layer is equal to or more than H in a pencil hardness test, more preferably equal to or more than 2H, and even more preferably equal to or more than 3H.

Adhesiveness between Coating Layer and Hard Coat Layer:

In the embodiments where the above-mentioned coating layer is laminated with the above-mentioned hard coat layer, preferably, they bond to each other in a mode of chemical bonding at their interface. For example, preferably, the polymerizing group having a vinyl moiety, an oxiranyl moiety or an aziridinyl moiety that the vinyl alcohol-based resin in the coating layer has, crosslinks or polymerizes with the ionizing radiation-curable polyfunctional monomer or oligomer of the hard coat layer by the action of ionizing radiations applied thereto, whereby the two bond to each other in a mode of chemical bonding.

Adhesiveness Test:

The interfacial chemical bonding may be confirmed by an adhesiveness test.

The adhesiveness may be measured and evaluated according to a cross-cut adhesiveness test of JIS K5600-5-6 (100 cross-cuts of 1 mm width each). The interfacial delamination between the layer that contains a vinyl alcohol-based resin and a layered inorganic compound and the hard coat layer may be confirmed through scanning electronic microscopy on the cross section of the film. Of the six ranks as grouped in JIS K5600-5-6 (from Group 0 of hardly-peeling samples to Group 5 of easily-peeling samples), the films of the invention are preferably grouped in Rank 2 or less, more preferably in Rank 0.

Antireflection Layer:

Preferably, the optical film of the invention comprises an antireflection layer. The antireflection layer may be provided for the purpose of reducing the reflectivity (for example, an antireflection layer is provided on the above-mentioned hard coat layer of the film). In terms of refractivity reduction, the antireflection layer preferably has a multi-layered structure, having at least a low-refractivity layer, or having a low-refractivity layer and optionally at least any of a middle-refractivity layer and a high-refractivity layer (for example, when the antireflection layer is formed on a hard coat layer, at least any of the middle-refractivity layer and the high-refractivity layer is preferably disposed between the hard coat layer and the low-refractivity layer).

The antireflection layer may be disposed in the film without a hard coat layer, but for the purpose of enhancing the physical strength of the film, the antireflection layer is preferably disposed on a hard coat layer in the film. The hard coat layer may have a two-layered or more multi-layered laminate structure.

High-Refractivity Layer, and Middle-Refractivity Layer:

In the optical film of the invention, a high-refractivity layer and a middle-refractivity layer may be provided to thereby enhance the antireflection property of the film owing to the optical interface with the low-refractivity layer to be mentioned hereinunder.

In this description, the high-refractivity layer and the middle-refractivity layer may be referred to as a generic term of high-refractivity layer. In this description, the expressions "high", "middle" and "low" of the high-refractivity layer, the middle-refractivity layer and the low-refractivity layer indicate the relative relationship of the level of the refractivity of the constitutive layers. With reference to the relation to a transparent film, the refractivity preferably satisfies the requirement of transparent film>low-refractivity layer, and high-refractivity layer>transparent film.

In this description, the high-refractivity layer, the middle-refractivity layer and the low-refractivity layer may be referred to as a generic term of antireflection layer.

In the embodiments where a low-refractivity layer is formed on a high-refractivity layer to constitute an antireflection layer, the refractive index of the high-refractivity layer is preferably from 1.55 to 2.40, more preferably from 1.60 to 2.20, even more preferably from 1.65 to 2.10, and still more preferably from 1.80 to 2.00.

In the embodiments where a middle-refractivity layer, a high-refractivity layer and a low-refractivity layer are formed on a transparent film in that order from the film to thereby construct an antireflection film, the refractive index of the high-refractivity layer is preferably from 1.65 to 2.40, more preferably from 1.70 to 2.20. The refractive index of the middle-refractivity layer is so controlled that it could be between the refractive index of the low-refractivity layer and the refractive index of the high-refractivity layer. Preferably, the refractive index of the middle-refractivity layer is from 1.55 to 1.80.

Specific examples of the inorganic particles to be used in the high-refractivity layer and the middle-refractivity layer include $TiO_2$, $ZrO_2$, $Al_2O_3$, $In_2O_3$, $ZnO$, $SnO_2$, $Sb_2O_3$, ITO and $SiO_2$. In terms of increasing the refractivity of the layers, preferred are $TiO_2$ and $ZrO_2$. Preferably, the inorganic filler may be surface-processed for silane coupling treatment or titanium coupling treatment, for which, for example, preferably employed is a surface-treating agent having a functional group capable of reacting with a binder on the filler surface.

Preferably, the content of the inorganic particles in the high-refractivity layer is from 10 to 90% by mass of the high-refractivity layer, more preferably from 15 to 80% by mass, even more preferably from 15 to 75% bymass. Two ormore different types of inorganic particles may be in the high-refractivity layer as combined therein.

In the embodiments where a low-refractivity layer is formed on the high-refractivity layer, preferably, the refractive index of the high-refractivity layer is higher than the refractive index of the transparent film.

Also preferably used in the high-refractivity layer is a binder prepared through crosslinking or polymerization reaction of an ionizing radiation-curable compound containing an aromatic ring, or an ionizing radiation-curable compound containing a halogen element except fluorine (e.g., Br, I, Cl), or an ionizing radiation-curable compound containing an element of S, N, P or the like.

The thickness of the high-refractivity layer may be suitably planned in accordance with the use thereof. In the embodiments where the high-refractivity layer is used as an optical interface layer, its thickness is preferably from 30 to 200 nm, more preferably from 50 to 170 nm, and even more preferably from 60 to 150 nm.

The haze of the high-refractivity layer is preferably lower when the layer does not contain antiglare particles. In that case, the haze is preferably equal to or less than 5%, more preferably equal to or less than 3%, and even more preferably equal to or more than 1%. Preferably, the high-refractivity layer is formed directly on the transparent film, or via any other layer thereon.

Low-Refractivity Layer:

For reducing the refractivity of the optical film of the invention, a low-refractivity layer is preferably formed on the film.

Preferably, the refractive index of the low-refractivity layer is from 1.20 to 1.46, more preferably from 1.25 to 1.46, even more preferably from 1.30 to 1.40.

The thickness of the low-refractivity layer is preferably from 50 to 200 nm, more preferably from 70 to 100 nm.

The haze of the low-refractivity layer is preferably equal to or less than 3%, more preferably equal to or less than 2%, even more preferably equal to or less than 1%. Concretely, the strength of the low-refractivity layer is preferably on a level of at least H in a pencil hardness test under a load of 500 g given to samples, more preferably at least 2H, and even more preferably at least 3H.

For improving the soiling resistance of the protective film, the film surface preferably has a contact angle to water of at least 90 degrees, more preferably at least 95 degrees, even more preferably at least 100 degrees.

Preferred embodiments of the composition to be used for preparing the low-refractivity layer include (1) a composition containing a crosslinkable or polymerizable functional group-having fluorine-containing polymer, (2) a composition containing a hydrolytic condensate of a fluorine-containing organosilane material, and (3) a composition containing a monomer having at least two ethylenic unsaturated groups and hollow-structured inorganic fine particles.

(Use of Optical Film)

The optical film of the invention may be used as a protective film for a polarizing plate.

<<Polarizing Plate>>

The invention also relates to a polarizing plate comprising a polarizing element and the optical film of the invention. One example of the polarizing plate of the invention comprises the optical film of the invention as at least one of two surface-protective films of the polarizing element. Preferably, the surface of the transparent film on the side opposite to the coating layer of the optical film, or that is, the surface thereof to be stuck to a polarizing element is hydrophilicated to thereby enhance the adhesiveness of the film on its adhering surface. The hydrophilicated surface is effective for enhancing the adhesiveness of the film to an adhesive layer that comprises polyvinyl alcohol as the main ingredient. The hydrophilication treatment is preferably saponification to be mentioned below. In saponification of the surface of the transparent film as the pretreatment to be attained prior to forming the coating layer in the invention, also preferred is the method mentioned below.

Saponification:

(1) Method of Dipping in Alkali Liquid:

The protective film for a polarizing plate is dipped in an alkali liquid under a suitable condition whereby all the surface of the film reactive with alkali is completely saponified. This method does not require any special equipment and is therefore favorable in terms of cost. Preferably, the alkali liquid is an aqueous sodium hydroxide solution. Its preferred concentration is from 0.5 to 3 mol/L, more preferably from 1 to 2 mol/L. The liquid temperature of the alkali liquid is preferably from 30 to 75° C., more preferably from 40 to 60° C.

Preferably, the combination of the saponification conditions is a combination of relatively mild conditions, and the conditions may be determined depending on the materials and the constitutions of the light-scattering film and the antireflection film and the intended contact angle.

After dipped in an alkali liquid, preferably, the film is fully washed with water or is dipped in a diluted acid to thereby neutralize the alkali component so that the alkali component does not remain in the film.

As a result of saponification, the surface (referred to as "rear face") of the transparent film on the side other than the side thereof having the coating layer is hydrophilicated.

The protective film for a polarizing plate is put into use with the hydrophilicated surface of the transparent film thereof kept adhered to the polarizing film.

The hydrophilicated surface is effective for improving the adhesiveness of the film to an adhesive layer comprising polyvinyl alcohol as the main ingredient thereof.

The degree of saponification is preferably such that the contact angle to water of the saponified rear face of the transparent film is lower in terms of the adhesiveness of the surface to a polarizing film; but on the other hand, in the dipping method, the coating layer, and, if necessary, an antiglare layer and a low-refractivity layer, disposed on the surface of the transparent film, are damaged by alkali, and therefore, it is important that the reaction condition is limited to the minimum necessary level. With the damage by alkali to the layers as the index, the contact angle to water of the opposite surface of the transparent support is referred to. For example, when the transparent support is triacetyl cellulose, the contact angle is preferably from 10 degrees to 50 degrees, more preferably from 30 degrees to 50 degrees, and even more preferably from 40 degrees to 50 degrees. When the angle is more than 50 degrees, it is unfavorable since there may occur a problem of adhesiveness to a polarizing film. On the other hand, when the angle is less than 10 degrees, it is also unfavorable since the damage is too large and may greatly detract from the physical strength of the film.

(2) Method of Coating with Alkali Liquid:

As a measure for evading the damages to the films in the above-mentioned dipping method, preferably employed is a method of coating with alkali liquid that comprises applying an alkali liquid to only the rear face of the transparent film under a suitable condition, then heating it, washing it with water and drying it. In this embodiment, the coating application means that the alkali liquid is contacted with only the rear face to be saponified, and includes not only the coating operation but also spraying with the liquid or contacting with a liquid-containing belt or the like. The method, when taken for saponification, requires some additional equipment and step for alkali liquid application, and is therefore inferior to the dipping method (1) in point of production cost. On the other hand, however, since the alkali liquid is contacted with the rear face to be saponified in the method, any layers comprising a material weak to alkali liquid may be formed on the opposite surface. For example, a vapor-deposited film and a sol-gel film may be much influenced by alkali liquid, for example, it may be corroded, dissolved or peeled by it; and therefore, the dipping method is unfavorable to those films. As opposed to this, in the coating method, such films are not contacted with alkali liquid, and therefore, the coating method is applicable to such films with no problem.

In both saponification methods (1) and (2) mentioned above, a transparent film may be unrolled and processed after the constitutive layers are formed thereon; and therefore, the treatment may be attained in a series of continuous operation after the above-mentioned, antiglare antireflection film production process. Further, the process of lamination of layers with a polarizing plate that comprises the unrolled transparent film may also be attained continuously as combined, and therefore a polarizing plate may be produced more efficiently in the roll-fed process than in a sheet-fed process.

(3) Method of Saponification After Protection of Antiglare Layer and Antireflection Layer with Laminate Film:

Like in the above (2), in case where the antiglare layer and/or the low-refractivity layer are poorly resistant to alkali liquid, a laminate film may be stuck to the final layer formed on a surface of a transparent film after all the layers up to the final layer have been formed thereon, and then it may be dipped in an alkali liquid, whereby only the rear face of the transparent film, for example triacetyl cellulose film, could be hydrophilicated, and thereafter the laminate film may be peeled off. According to this method, the transparent film may be hydrophilicated only on the rear face thereof opposite to the side of the film having the final layer formed thereon, to a degree necessary for protective film for a polarizing plate with no damage to the coating layer, or optionally disposed the antiglare layer and the low-refractivity layer. As compared with the above-mentioned method (2), this method is advantageous in that it does not require any special apparatus for alkali liquid application, though the laminate film used may be a waste in the method.

(4) Method of Dipping in Alkali Liquid After Formation of Antiglare Layer:

The constitutive layers including the antiglare layer are resistant to alkali liquid; however, when the low-refractivity layer is poorly resistant to alkali liquid, the film is dipped in an alkali liquid after formation of the constitutive layers including antiglare layer whereby both its surfaces are hydrophilicated, and thereafter a low-refractivity layer may be formed on the antiglare layer. The production process may be complicated, but in case where the low-refractivity layer is a fluorine-containing sol-gel film or the like having a hydrophilic group, the method is advantageous in that the interlayer adhesiveness between the antiglare layer and the low-refractivity layer is increased.

(5) Method of Forming Coating Layer on Pre-Saponified Transparent Film:

A transparent film, for example, triacetyl cellulose film, is previously saponified by dipping it in an alkali liquid, and a coating layer may be formed on any one surface thereof directly or via any other layer. In case where the film is dipped in an alkali liquid and is thereby saponified, the interlayer adhesiveness between the coating layer and the surface of the transparent film hydrophilicated by saponification may worsen. In such a case, after the saponification, only the surface of the film on which the coating layer is to be formed is processed for corona discharge or glow discharge treatment to thereby remove the hydrophilicated surface, and thereafter an antiglare layer and other layers may be formed thereon. In the embodiment where the antiglare layer and the other layers have a hydrophilic group, the interlayer adhesiveness may be good.

Polarizing Element:

Preferably, the polarizing element comprises polyvinyl alcohol (PVA) and a dichroic molecule; but as in JPA No. 11-248937, PVA or polyvinyl chloride may be dewatered and dechlorinated to form a polyene structure, and this may be aligned to give a polyvinylene-based polarizing element, and this may be used herein.

Preparation of Polarizing Plate:

The polarizing plate of the invention may be prepared by sticking an optical film of the invention to at least one surface of a polarizing element. Preferably, a polymer film is stuck to the other surface of the polarizing element as a protective film. The protective film preferably has a degree of moisture permeation of from 800 to 3,000 g/m$^2$·day, and more preferably from 1,000 to 1,700 g/m$^2$·day. For it, preferably used are ordinary cellulose triacetate (TAC) film, etc. As the protective film, also usable is a cellulose acetate film produced according to a solution-casting film formation method and stretched at a stretching ratio of from 10 to 100% in the cross direction of the roll film.

<<Liquid-Crystal Display Device>>

The invention also relates to a liquid-crystal display device comprising the optical film of the invention or the polarizing plate of the invention. The film and the polarizing plate of the invention are advantageously used in liquid-crystal display devices; and preferably, they are disposed on the side nearer to the display panel than to the liquid-crystal cell. In the embodiments where the coating layer has a gas barrier property, preferably, the coating layer is disposed to be more outside in the device.

The liquid-crystal display device has two polarizing plates disposed on both sides of the liquid-crystal cell therein, and the liquid-crystal cell carries a liquid crystal between two electrode substrates. Further, one optically-anisotropic layer may be disposed between the liquid-crystal cell and one polarizing plate; or two optically-anisotropic layers may be disposed each between the liquid-crystal cell and the two polarizing plates. As at least one of the two polarizing plates, the polarizing plate of the invention may be used, and preferably, it is used as the polarizing plate on the display panel side.

The liquid crystal display device of the invention may employ any mode such as TN (Twisted Nematic) mode, VA (vertically aligned) mode, OCB (optically compensated bend) mode, IPS (in-plane switching) mode or ECB (electrically controlled birefringence) mode.

Optically Anisotropic Layer:

The liquid crystal display device of the invention preferably comprises at least one optically anisotropic layer disposed between the polarizing plate and the liquid crystal cell. One examples of the optically anisotropic layer is a layer formed of a liquid crystal composition fixed in a hybrid alignment state. The optically anisotropic layer may be formed on a support formed of a polymer film such as a cellulose acetate film, cyclic olefin based film and polypropylene film to give an optical compensation film; and such an optical compensation film may be employed in a liquid crystal display device. Preferably, an alignment layer is disposed between the optically anisotropic layer and the support for aligning liquid crystal molecules in a desired alignment state. The support may function as another functional member such as protective film of a polarizing plate in the liquid crystal display device. The optically anisotropic layer may be formed on the optical film of the invention. In such an embodiment, the coating layer preferably functions as an alignment layer to be used for preparing the optically anisotropic layer.

Examples of the liquid crystal compound include rod-like liquid crystal compounds and discotic liquid crystal compounds. Especially, discotic liquid crystal compounds are preferable. Preferable examples of the discotic liquid crystal compound to be used for preparing the optically anisotropic layer include the compounds represented by formula (DI) below. These compounds show high birefringence, and are preferable. Among the compounds represented by formula (DI), the compounds exhibiting discotic liquid crystallinity are more preferable, and the compounds having a discotic-nematic phase are even more preferable.

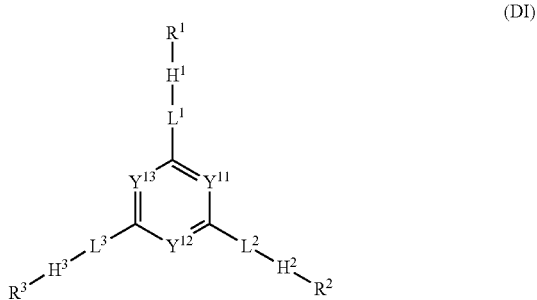

(DI)

Examples of the discotic liquid crystal compound, which is suitable for use in preparing the optically anisotropic layer, include those described in JPA No. 2006-76992, [0052], and JPA No. 2007-2220, [0040] to [0063].

Preferable examples of the discotic liquid crystal compound, which can be used for preparing the optically anisotropic layer, include those described in JPA No. 2005-301206.

The optically anisotropic layer may be prepared as follows. A composition comprising at least one liquid crystal compound is applied to a surface, for example surface of an alignment layer, and aligned in a desired alignment state; and then fixed the alignment state via polymerization. The alignment state to be fixed is preferably a hybrid alignment state. The hybrid alignment means an alignment state where the director direction of liquid-crystal molecules continuously change in the thickness direction of the layer. For rod-like molecules, the director is in the long axis direction; and for discotic molecules, the director is a direction along any radius of the discotic face.

The composition may comprise at least one additive for aligning in a desired alignment state or for improving its coating-ability or curing-ability.

An additive, referred to as "additive for controlling air-interface alignment" hereinafter, capable of controlling alignment at the air-interface of the layer may be added to the composition. Examples of such an additive include the low-molecular or high-molecular weight compounds having a fluorinated-alkyl group and a hydrophilic group such as sulfonyl. Specific examples of the additive for controlling air-interface alignment include those described in JPA No. 2006-267171.

In the embodiment where the composition is prepared as a coating liquid and the optically anisotropic layer is prepared by applying the coating liquid to a surface, surfactant may be added to the composition for improving coating-ability. Surfactant is preferably selected from fluorine-compounds, and specific examples of such a surfactant include compounds described in JPA No. 2001-330725, [0028] to [0056]. Commercially available "MEGAFACE F780" (produced by DIC Corporation) or the like may be used.

Preferably, the composition comprises a polymerization initiator(s). Examples of the polymerization initiator include thermal polymerization initiators and photopolymerization initiators. Of those, preferred are photopolymerization initiators. Preferred examples of the polymerization initiator that generates radicals by the action of light given thereto are α-carbonyl compounds (as in U.S. Pat. Nos. 2,367,661, 2,367,670), acyloin ethers (as in U.S. Pat. No. 2,448,828,) α-hydrocarbon-substituted aromatic acyloin compounds (as in U.S. Pat. No. 2,722,512), polycyclic quinone compounds (as in U.S. Pat. Nos. 3,046,127, 2,951,758), combination of triarylimidazole dimer and p-aminophenyl ketone (as in U.S. Pat. No. 3,549,367), acridine and phenazine compounds (as in JP-A 60-105667, U.S. Pat. NO. 4,239,850) and oxadiazole compounds (as in U.S. Pat. No. 4,212,970), acetophenone compounds, benzoin ether compounds, benzyl compounds, benzophenone compounds, thioxanthone compounds. Examples of the acetophenone compound include, for example, 2,2-diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetopheone, p-azidobenzalacetophenone. Examples of the benzyl compound include, for example, benzyl, benzyl dimethyl ketal, benzyl β-methoxyethyl acetal, 1-hydroxycyclohexyl phenyl ketone. The benzoin ether compounds include, for example, benzoin, benzoin methyl ether, benzoin ethyl ether, benzoin n-propyl ether, benzoin isopropyl ether, benzoin n-butyl ether, and benzoin isobutyl ether. Examples of the benzophenone compound include benzophenone, methyl o-benzoylbenzoate, Michler's ketone, 4,4'-bisdiethylaminobenzophenone, 4,4'-dichlorobenzophenone. Examples of the thioxanthone compound include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Of those aromatic ketones serving as a light-sensitive radical polymerization initiator, more preferred are acetophenone compounds and benzyl compounds in point of their curing capability, storage stability and odorlessness. One or more such aromatic ketones may be used herein as a light-sensitive radical polymerization initiator, either singly or as combined depending on the desired performance of the initiator.

For the purpose of increasing the sensitivity thereof, a sensitizer may be added to the polymerization initiator. Examples of the sensitizer are n-butylamine, triethylamine, tri-n-butyl phosphine, and thioxanthone.

Plural types of the photopolymerization initiators may be combined and used herein, and the amount thereof is preferably from 0.01 to 20% around by mass of the solid content of the coating liquid, more preferably from 0.5 to 5% around by mass. For light irradiation for polymerization of the liquid-crystal compound, preferably used are UV rays.

The composition may comprise a polymerizable non-liquid crystal monomer(s) along with the polymerizable liquid crystal compound. Examples of the polymerizable monomer include compounds having a vinyl, vinyloxy, acryloyl or methacryloyl. For improving the durability, polyfunctional monomars, having two or more polymerizable groups, such as ethyleneoxide-modified trimethylolpropane acrylates maybe used.

The amount of the polymerizable non-liquid crystal monomer is preferably equal to or less than 15 mass % around and more preferably from 0 to 10 mass % around with respect to the amount of the liquid crystal compound.

The optically anisotropic layer may be produced according to a method comprising applying a coating liquid, which is the composition, to a surface of an alignment layer, drying it to remove solvent from it and align liquid crystal molecules, and then curing it via polymerization.

The coating method may be any known method of curtain-coating, dipping, spin-coating, printing, spraying, slot-coating, roll-coating, slide-coating, blade-coating, gravure-coating or wire bar-coating.

Drying the coating layer may be carried out under heat. During drying it, while solvent is removed from it, liquid crystal molecules therein are aligned in a preferred state.

Next, the layer is irradiated with UV light to carry out polymerization reaction, and then the alignment state is immobilized to form an optically anisotropic layer.

The irradiation energy is preferably from 20 mJ/cm$^2$ to 50 J/cm$^2$, more preferably from 100 mJ/cm$^2$ to 800mJ/cm$^2$. For promoting the optical polymerization, the light irradiation may be attained under heat.

The thickness of the optically anisotropic layer may be from 0.1 to 10 μm or from 0.5 to 5 μm.

Drying the coating layer may be carried out under heat. During drying it, while solvent is removed from it, liquid crystal molecules therein are aligned in a preferred state.

Next, the layer is irradiated with UV light to carry out polymerization reaction, and then the alignment state is immobilized to form an optically anisotropic layer.

The irradiation energy is preferably from 20 mJ/cm$^2$ to 50 J/cm$^2$, more preferably from 100 mJ/cm$^2$ to 800 mJ/cm$^2$. For promoting the optical polymerization, the light irradiation may be attained under heat.

The thickness of the optically anisotropic layer may be from 0.1 to 10 μm or from 0.5 to 5 μm. Drying the coating layer may be carried out under heat. During drying it, while solvent is removed from it, liquid crystal molecules therein are aligned in a preferred state.

Next, the layer is irradiated with UV light to carry out polymerization reaction, and then the alignment state is immobilized to form an optically anisotropic layer.

The irradiation energy is preferably from 20 mJ/cm$^2$ to 50 J/cm2, more preferably from 100 mJ/cm$^2$ to 800 mJ/cm$^2$. For promoting the optical polymerization, the light irradiation may be attained under heat.

The thickness of the optically anisotropic layer may be from 0.1 to 10 μm or from 0.5 to 5 μm.

The optically anisotropic layer may be prepared by using an alignment layer, and examples of the alignment layer include polyvinyl alcohol layers and polyimide layers.

(Other Applications)

Touch Panel:

The optical film of the invention may be used in touch panels described in JPA Nos. hei 5-127822 and 2002-48913.

Organic EL Device:

The optical film of the invention may be used as a substrate (base film) or a protective film in Organic EL devices.

According to the embodiments where the optical film is used in organic EL devices, the descriptions of JPA Nos. hei 11-3 35661, hei 11-335368, 2001-192651, 2001-192652, 2001-192653, 2 001-335776, 2001-247859, 2001-181616, 2001-181617, 2002--181816, 2002-181617 and 2002-056976 may be referred to and applied to.

Preferably, the descriptions of JPA Nos. 2001-148291, 2001-22 1916, and 2001-231443 are combined with those.

EXAMPLES

The invention is described more concretely with reference to the following Examples, in which the material and the reagent used, their amount and the ratio, the details of the treatment and the treatment process may be suitably modified or changed not overstepping the spirit and the scope of the invention. Accordingly, the invention should not be limited by the Examples mentioned below.

1. Synthetic Example 1

1.-1 Synthesis of Polymer 1

Into a 300-ml three-neck flask equipped with a stirrer, 14.7 g of polyvinyl alcohol (Kuraray's trade name, PVA-103, having a degree of saponification of from 98 to 99 mol %) and 100 ml of dimethylsulfoxide previously dewatered with Molecular Sieve 4A were, and dissolved under stirring at room temperature.

Next, this was heated up to 70° C., and a solution of 0.776 g of methacryloyloxyethyl isocyanate in 15 ml of dimethylsulfoxide was added dropwise thereto.

This was kept stirred as such for 2 hours, then filtered through a paper towel to remove impurities such as refuse, and thereafter this was added dropwise to 1.25 liter of ethyl acetate under stirring to thereby precipitate the polymer.

The precipitate (polymer) was collected by filtration, washed by dipping and stirring it in 600 ml of methanol, and then again collected by filtration to give 14.0 g (yield, 91%) of a massive polymer 1.

NMR Spectrum (solvent DMSO-d$_6$):

The obtained polymer 1 had the following proton at a weak intensity that the starting PVA-103 did not have, in addition to the main chain proton, the hydroxyl group proton and the acetyl group proton.

δ=5.7, 6.1 ppm, assigned to the vinyl group proton.

1.-2 Measurement of Visible Absorption Spectrum of Polymer 1, and Determination of Methacryloyl Group Introduction y into Polymer 1

Next 0.015 g of the polymer 1 was accurately weighed and put into a 50 ml-volumetric flask, and distilled water was added thereto to prepare an aqueous 0.03% solution. The solution was analyzed for visible absorption spectrometry using a visible-IR spectrophotometer (UV-2200, by Shimadzu Seisakusho).

Maximum absorption wavelength (λmax)=202 nm.

Absorbance (202 nm)=0.839.

On the other hand, similarly, polyvinyl alcohol (PVA-103, by Kuraray) used as the starting material for the polymer 1 was analyzed for absorption spectrometry. Its absorbance at 202 nm was 0.504. Further, the methacryloyl group-having isocyanate compound used in the above production was reacted with methanol, and a 1×10$^{-4}$ M solution of the obtained urethane compound in methanol was prepared, and analyzed for absorption spectrometry in the same manner as above.

Maximum absorption wavelength (λmax)=202 nm.

Absorbance=0.903.

Molecular extinction coefficient($_\epsilon$)=8.42×10$^4$ M$^{-1}$·cm.

Accordingly, it is understandable that the introduction of methacryloyloxyethyl isocyanate into the hydroxyl group of polyvinyl alcohol brought about the increase in the absorbance at λmax=202 nm of the polymer 1. The degree of introduction (y) was determined from the found data of the absorbance (y=1.7).

2. Preparation of Coating Liquid for Coating Layer

2.-1 Preparation of Coating Liquid a-1 for Coating Layer

A coating liquid a-1 for coating layer was prepared, having the formulation mentioned below.

Concretely, the layered inorganic compound was added to water, then dispersed three times under high pressure of 30 MPa, using a high-pressure disperser, whereby the compound was dispersed in water. Next, above polymer 1 was stirred in water at 90° C. for 2 hours and dissolved therein, then cooled to room temperature, and methanol and acetone were added thereto. After that, Crosslinking agent A1 and malic acid were added to the solution by the amount shown below. The solution was filtered through a polypropylene filter having a pore size of 100 μm, thereby preparing a coating liquid, Coating liquid a-1, for coating layer.

[Formulation of Coating Liquid a-1 for Coating Layer]

| | |
|---|---|
| Polymer 1 | 7 mas. pts. |
| Layered inorganic compound MEB-3 (by Co-op Chemical; synthetic mica, aqueous dispersion having a solid content of 8%) | 4.4 mas. pts. |
| Crosslinking agent A1 | 7.7 mas. pts. |
| Malic acid | 0.7 mas. pts. |
| Water | 80 mas. pts. |
| Methanol | 10 mas. pts. |
| Acetone | 10 mas. pts. |

2.-2 Preparation of Crosslinking Agent A1

Into a 200-ml flask, 28.4 g (0.1 mols) of tetraisopropyl titanate was fed, and 29.8 g (0.2 mols) of triethanolamine was added thereto under stirring, taking 40 minutes. After the addition, this was refluxed at 85° C. for 30 minutes, and further 30.4 g (0.4 mols) of 1,2-propanediol and water were added to it, thereby preparing a crosslinking agent A1 having a titanium content of 1.5%.

2.-3 Preparation of Crosslinking Agent A2

A crosslinking agent A2 was prepared in the same manner as that for the crosslinking agent A1, to which, however, triethanolamine and 1,2-propanediol were not added.

2.-4 Preparation of Crosslinking Agent A3

A crosslinking agent A3 was prepared in the same manner as that for the crosslinking agent A1, to which, however, tetraisopropyl titanate was not added.

2.-5 Preparation of Crosslinking Agent B1

Into a 200-ml flask, 35.4 g of Newtex's Zircosol ZC-2 (aqueous solution of basic zirconyl chloride with 35% of $ZrO_2$), 8.2 g of dihydroxyethylglycine and 94 g of water were put, thereby preparing a crosslinking agent B1 of Zr compound/chelating agent=1/0.5 (by mol).

2.-6 Preparation of Crosslinking Agent B2

A crosslinking agent B2 was prepared in the same manner as that for the crosslinking agent B1, to which, however, dihydroxyethylglycine was not added.

2.-7 Preparation of Crosslinking Agent B3

A crosslinking agent B3 was prepared in the same manner as that for the crosslinking agent B1, to which, however, Zircosol ZC-2 was not added.

2.-8 Preparation of Coating Liquids a-2 to a-13 and b-1 to b-2 for Coating Layers Similarly to the preparation method for the coating liquid a-1 for coating layer as above, coating liquids a-2 to a-13 and b-1 to b-2 for coating layers were prepared, each having the formulation mentioned below. It is to be noted that vinyl alcohol-based resins used for preparing coating liquids a-9 to a-13 and b-2 respectively were prepared in the similar manner to that of Polymer 1. And the identification of each polymer was carried out according to the same method.

| Coating liquid | Vinyl alcohol-based resin | Cross-linking agent | Titanium compound | Hydroxy carboxylic acid | Aliphatic amine | Glycol |
|---|---|---|---|---|---|---|
| a-1 | Polymer 1 | A1 | tetra-isopropyl titanate | malic acid | triethanol amine | 1,2-propane diol |
| a-2 | Polymer 1 | A1 | tetra-isopropyl titanate | lactic acid | triethanol amine | 1,2-propane diol |
| a-3 | Polymer 1 | A1 | tetra-isopropyl titanate | citric acid | triethanol amine | 1,2-propane diol |
| a-4 | Polymer 1 | A1 | tetra-isopropyl titanate | — | triethanol amine | 1,2-propane diol |
| a-5 | Polymer 34 | A1 | tetra-isopropyl titanate | malic acid | triethanol amine | 1,2-propane diol |
| a-6 | Polymer 61 | A1 | tetra-isopropyl titanate | malic acid | triethanol amine | 1,2-propane diol |
| a-7 | Polymer E | A1 | tetra-isopropyl titanate | malic acid | triethanol amine | 1,2-propane diol |
| a-8 | Polymer 1 | A2 | tetra-isopropyl titanate | malic acid | — | — |
| b-1 | Polymer 1 | A3 | — | malic acid | triethanol amine - | 1,2-propane diol |

| Coating liquid | Vinyl Alcohol-based polymer | Cross-linking agent | Zirconium compound | Amino carboxylic acid |
|---|---|---|---|---|
| a-9 | Polymer 5 | B1 | Basic zirconyl chloride | dihydroxy methylglycine |
| a-10 | Polymer 5 | B2 | Basic zirconyl chloride | — |
| a-11 | Polymer 30 | B1 | basic zirconyl chloride | dihydroxy methylglycine |
| a-12 | Polymer 42 | B1 | basic zirconyl chloride | dihydroxy methylglycine |
| a-13 | Polymer 62 | B1 | basic zirconyl chloride | dihydroxy methylglycine |
| b-2 | Polymer 5 | B3 | — | dihydroxy methylglycine |

3. Preparation of Coating Layer for Hard Coat Layer Preparation of Sol 1:

Into a 1,000-ml reactor equipped with a thermometer, a nitrogen-introducing duct and a dropping funnel, 187 g (0.80 mols) of acryloxypropyltrimethoxysilane, 27.2 g (0.20 mols) of methyltrimethoxysilane, 320 g (10 mols) of methanol and 0.06 g (0.001 mols) of KF were fed, and, under stirring at room temperature, was added gradually and dropwise with 15.1 g (0.86 mols) of water. After the addition, this was stirred at room temperature for 3 hours, and then heated under stirring for 2 hours under reflux of methanol.

Next, a low-boiling fraction was evaporated away under reduced pressure, and the residue was further filtered to give 120 g of a sol 1. Thus obtained, the substance was analyzed by GPC. The mass-average molecular weight of the substance was 1,500. Of the oligomer ingredient and other more polymeric ingredients, the fraction having a molecular weight of from 1,000 to 20,000 accounted for 30% of the product.

As a result of analysis by $^1$H-NMR, the obtained substance had a structure of following formula (4):

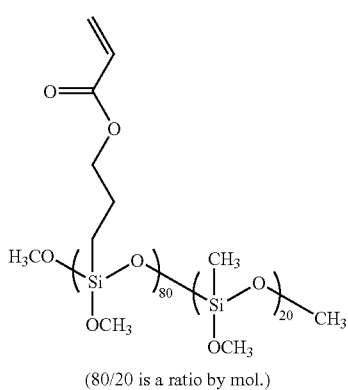

(4)

(80/20 is a ratio by mol.)

Further, the degree of condensation, α, as determined through $^{29}$Si-NMR, was 0.56. The analytic data confirmed that the major part of the silane coupling agent sol was a linear structure.

Gas chromatography of the product confirmed that the residual percentage of the starting acryloxypropyltrimethoxysilane in the product was at most 5%.

The following ingredients were put into a mixing tank and stirred to dissolve the ingredients, and the solution was filtered through a polypropylene filter having a pore size of 30 μm to prepare a coating liquid for hard coat layer.

| [Formulation of Coating Liquid for Hard Coat Layer] | |
|---|---|
| PET-30 | 40.0 g |
| DPHA | 10.0 g |
| Irgacure 184 | 2.0 g |
| SX-350 (30%) | 2.0 g |
| Crosslinked acryl-styrene particles (30%) | 13.0 g |
| FP-13 | 0.06 g |
| Sol 1 | 11.0 g |
| Toluene | 238.5 g |

The compounds used in the above are shown below.

PET-30: Mixture of pentaerythritol triacrylate and pentaerythritol tetraacrylate (by Nippon Kayaku).

Irgacure 184: Polymerization initiator (by Ciba Speciality Chemicals).

SX-350: Crosslinked polystyrene particles having a mean particle diameter of 3.5 μm (refractive index 1.60; manufactured by Soken Chemical; 30% toluene dispersion; after dispersed with a polytron disperser at 10,000 rpm for 20 minutes, this was used).

Crosslinked acryl-styrene particles; having a mean particle diameter of 3.5 μm (refractive index 1.55; manufactured by Soken Chemical; 30% toluene dispersion; after dispersed with a polytron disperser at 10,000 rpm for 20 minutes, this was used).

4. Preparation of Coating Liquid for Low-Refractivity Layer 13 g of thermal-crosslinking fluorine-containing polymer containing polysiloxane and a hydroxyl group and having a refractive index of 1.44 (JTA113, having a solid content of 6%, manufactured by JSR), 1.3 g of colloidal silica dispersion MEK-ST-L (Nissan Chemical's trade name, having a mean particle diameter of 45 nm and having a solid content of 30%), 0.65 g of the above-mentioned sol, 4.4 g of methyl ethyl ketone, and 1.2 g of cyclohexanone were mixed and stirred, and then this was filtered through a polypropylene filter having a pore size of 1 μm to prepare a coating liquid for low-refractivity layer. The layer formed of the coating liquid had a refractive index of 1.45.

5. Example 1

5.-1 Preparation of Protective Film for Polarizing Plate

5.-1-1 Formation of Coating Layer

Both surfaces of a triacetyl cellulose film (TAC-T80UZ, by FUJIFILM) were saponified with an alkali solution (1 mol/L) at 50° C.

Next, using a coater with a slot die, coating liquid a-1 was applied onto one saponified surface of the triacetyl cellulose film so as to have a dry film thickness of 2 μm. The coating was attained at a traveling speed of 5 m/min, and then the film was dried at 110° C. for 3 minutes and wound up.

5.-1-2 Formation of Hard Coat Layer

The roll of the coating layer-having protective film for a polarizing plate was unrolled, and using a coater with a slot die, the coating liquid for hard coat layer was applied onto the same side as that of the vinyl alcohol-based resin layer (coating layer) of the protective film for a polarizing plate on a backup roll, directly by extruding it onto the layer. The coating was attained at a traveling speed of 30 m/min, then the coated film was dried at 30° C. for 15 seconds and then at 90° C. for 20 seconds, and thereafter with nitrogen purging, this was irradiated with UV rays, using an air-cooling metal halide lamp of 160 W/cm (by Eyegraphics) at a dose of 90 mJ/cm$^2$, thereby curing the coated layer to give an antiglare layer having a thickness of 6 μm. The film was then wound up.

5.-1-3 Formation of Low-Refractivity Layer

The roll of protective film for a polarizing plate, thus having the hard coat layer formed thereon in the manner as above, was unrolled, and using a coater with a slot die, the coating liquid for low-refractivity layer was applied onto the surface of the hard coat layer of the protective film for a polarizing plate on a backup roll, directly by extruding it onto the layer.

This was dried at 120° C. for 150 seconds and then at 140° C. for 8 minutes, and thereafter in an atmosphere having an oxygen concentration of 0.1% by nitrogen purging, this was irradiated with UV rays, using an air-cooling metal halide lamp of 240 W/cm (by Eyegraphics) at a dose of 300 mJ/cm$^2$, thereby forming a low-refractivity layer having a thickness of 100 nm, and this was wound up. Accordingly, a low-refractivity layer was formed on the hard coat layer-having protective film for a polarizing plate.

In this way, a protective film for a polarizing plate consisting of a transparent film, a coating layer, a hard coat layer (antiglare layer), and low-refractivity layer was prepared.

5.-2 Evaluation of Protective Film for Polarizing Plate

5.-2-1 Evaluation of Brittleness:

The thus-fabricated protective film for a polarizing plate was tested for brittleness. Concretely, the film was cut into samples having a size of 35 mm×140 mm, left under the condition of a temperature of 25° C. and a relative humidity of 60% for 2 hours, and then cylindrically-rolled up. The diameter of curvature with which the rolled sample began to crack was measured, and the samples were evaluated according to the evaluation standards mentioned below. The evaluation results are shown in Table below.

Evaluation Standards:

A: There was no crack in the sample which was cylindrically-rolled up with a diameter of curvature equal to or less than 50 mm.

B: There was at least one crack in the sample which was cylindrically-rolled up with a diameter of curvature equal to or less than 50 mm, and there was no crack in the sample which was cylindrically-rolled up with a diameter of curvature equal to 60 mm.

C: There was at least one crack in the sample which was cylindrically-rolled up with a diameter of curvature equal to or more than 60 mm, and the sample was problematic in its practical use.

5.-2-2 Evaluation of Adhesiveness

The prepared protective film for a polarizing plate was tested and evaluated for the adhesiveness at the interface between the coating layer and the hard coat layer, according to a cross-cut method of JIS K5600-5-6 (100 cross-cuts of 1 mm width each).

Concretely, using a cutter knife, the surface of the film on the side having the coating layer thereon was cross-cut to give 11 vertical cuts and 11 horizontal cuts at intervals of 1 mm, thereby forming 100 square cross-cuts in total. An adhesive polyester tape (No. 31B by Nitto Denko) was stuck to it under pressure, left as such for 24 hours, and then, this was peeled off. This test was repeated three times at the same site, and the cross-cut surface was visually checked for the presence or absence of cross-cut peeling. Based on this, the tested sample was evaluated.

Regarding the evaluation standards, the samples were grouped into 6 ranks of those that were hardly peeled (Group 0) to those that were readily peeled (Group 5). The evaluation results are shown in Table below.

Evaluation Standards:
A: Group 0
B: Groups 1 and 2
C: Groups 3 to 5

5.-2-3 Evaluation of Durability

The prepared protective film for a polarizing plate was left under a high-temperature and high-humidity condition at 60° C. and 95% RH for 48 hours, then taken out into an environment at 25° C. and 60% RH; and after left therein for 10 minutes, the protective film for polarization was tested for the peeling resistance and the adhesiveness according to a cross-cut method of JIS K5600-5-6 (100 cross-cuts of 1 mm width each).

The sample was visually checked for peeling, and evaluated according to the following 3 ranks.

A: The sample did not peel at all, and had no problem.
B: The sample peeled slightly at its edge, but no problem in practical use.
C: The sample peeled greatly, and was problematic in practical use.

6. Examples 2 to 13, and Comparative Examples 1 to 2

<Fabrication of Protective Film for Polarizing plate>

Protective films for a polarizing plate of Examples 2 to 13 and Comparative Examples 1 to 2 were prepared in the same manner as in Example 1, for which, however, the coating liquids and the thickness of the coating layers were changed as shown in Table below. Also in the same manner as in Example 1, the prepared protective films were tested and evaluated, and their results are shown in Table below.

7. Examples 14 to 17

Protective films for a polarizing plate of Examples 14, 15, 16 and 17 were prepared and evaluated in the same manner as in Example 1, for which, however, the thickness 2 μm of the film formed of coating liquid a-1 for coating layer was changed as shown in Table below.

8. Comparative Example 3

3 g of a PVA film (by Kuraray, having a degree of polymerization of 2400 and completely saponified) was swollen in a water bath at 30° C., and stretched by 3 times in the swelling bath. Next, the crosslinking agent Al used in Example 1 was heated at 60° C., and the above PVA film was dipped in this solution for 1 minutes and stretched by 2 times (the accumulated stretching ratio was 6 times). Next, this was dried at 105° C. for 2 hours, thereby giving an optical film of Comparative Example 3.

In the same manner as in Example 1, a hard coat layer and a low-refractivity layer were formed by coating on one surface of the optical film of Comparative Example 3, thereby preparing a protective film for a polarizing plate; and this was evaluated in the same manner as in Example 1.

9. Production and Evaluation of Liquid Crystal Display Device

9.-1 Preparation of Polarizing Plate

9.-1-1 Preparation of Polarizing Element

A polyvinyl alcohol film having a thickness of 120 μm was dipped in an aqueous solution containing 1 part by mass of iodine, 2 parts by mass of potassium iodide and 4 parts by mass of boric acid, and stretched by 4 times at 50° C. to prepare a polarizing element.

9.-1-2 Production of Other Protective Film for Polarizing Plate

A WV film coated with an optically-anisotropic layer (manufactured by FUJIFILM) was dipped in an aqueous sodium hydroxide solution (1.5 mol/L) at 55° C. for 120 seconds, then washed with water and dried.

9.-1-3 Preparation of Polarizing Plate

Using an aqueous 5% solution of a completely-saponified polyvinyl alcohol as an adhesive, the protective film for a polarizing plate of Examples 1 to 17 and Comparative Examples 1 to 3, and the above-mentioned, saponified WV film were stuck to the above-mentioned polarizing element, with the surface of the former not coated with the hard coat layer and the low-refractivity layer, and the surface of the latter not coated with the optically-anisotropic layer facing the polarizing element; and then this was dried at 70° C. to produce a polarizing plate.

9.-2 Production of Liquid-Crystal Display Device

Production of TN-Mode Liquid-Crystal Display Device:

In a liquid-crystal display device employing a TN-mode liquid-crystal cell (MDT-191S, by Mitsubishi Electric), the polarizing plate was removed, and in place of it, the polarizing plate comprising each of the protective film of Examples 1 to 17 and Comparative Examples 1 to 3 was stuck to the device on the viewing side. The substitute polarizing plate was stuck thereto with an adhesive in such a manner that its transmission axis was the same as that of the original polarizing plate.

9.-3 Evaluation of Light Leakage (Evaluation of Peripheral unevenness)

Each of the produced liquid-crystal display devices was kept at 60° C. and 95% RH for 5 days, and then taken out into an environment at 25° C. and 60% RH. 30 minutes later after it was taken out into the environment, the device was driven in the black state; and then, after 1 hour, the brightness distribution was determined with a brightness meter. The brightness difference between the panel center and the center of the edge of the long side of the polarizing plate was calculated; ad the sample was evaluated according to the following evaluation standards. The evaluation results are shown in Table below.

Evaluation Standards:

A: The brightness in the black state was smaller than 0.1 cd/cm$^2$, and the sample would have no problem in practical use.

B: The brightness in the black state was from 0.1 cd/cm$^2$ to 0.3 cd/cm$^2$, and the light leakage was confirmed visually but the sample would have no problem in practical use.

C: The brightness in the black state was from 0.3 cd/cm$^2$ to 0.5 cd/cm$^2$, and the sample is expected to be problematic in practical use.

D: The brightness in the black state was larger than 0.5 cd/cm$^2$, and the sample is expected to be problematic in practical use.

| | Coating layer | | Evaluation of Protective Film | | | | Evaluation of LCD |
| --- | --- | --- | --- | --- | --- | --- | --- |
| | | | Before durability test | | After durability test | | Light |
| | Coating liquid | Thickness μm | 5.-2-2 *1 | 5.-2-1 *2 | 5.-2-2 *1 | 5.-2-3 *3 | leakage *4 |
| Example 1 | a-1 | 2 | A | A | A | A | A |
| Example 2 | a-2 | 2 | A | A | A | A | A |
| Example 3 | a-3 | 2 | A | A | A | A | A |
| Example 4 | a-4 | 2 | A | A | A | B | B |
| Example 5 | a-5 | 2 | A | A | A | A | A |
| Example 6 | a-6 | 2 | A | A | A | A | A |
| Example 7 | a-7 | 2 | A | A | A | A | A |
| Example 8 | a-8 | 2 | A | A | A | B | B |
| Example 9 | a-9 | 2 | A | A | A | A | A |
| Example 10 | a-10 | 2 | A | A | A | B | B |
| Example 11 | a-11 | 2 | A | A | A | A | A |
| Example 12 | a-12 | 2 | A | A | A | A | A |
| Example 13 | a-13 | 2 | A | A | A | A | A |
| Example 14 | a-1 | 1 | A | A | A | A | B |
| Example 15 | a-1 | 1.5 | A | A | A | A | A |

-continued

| | Coating layer | | Evaluation of Protective Film | | | | Evaluation of LCD Light leakage *4 |
|---|---|---|---|---|---|---|---|
| | | | Before durability test | | After durability test | | |
| | Coating liquid | Thickness μm | 5.-2-2 *1 | 5.-2-1 *2 | 5.-2-2 *1 | 5.-2-3 *3 | |
| Example 16 | a-1 | 8 | A | A | A | A | A |
| Example 17 | a-1 | 15 | A | B | A | A | A |
| Comparative Example 1 | b-1 | 2 | B | A | C | C | C |
| Comparative Example 2 | b-2 | 2 | B | A | C | C | C |
| Comparative Example 3 | — | 29 | C | C | C | C | C |

*1: This is the result of the evaluation of adhesiveness regarding each sample, which was carried out according to the method described in "5.-2-2 Evaluation of Adhesiveness".
*2: This is the result of the evaluation of brittleness regarding each sample, which was carried out according to the method described in "5.-2-1 Evaluation of Brittleness".
*3: This is the result of the evaluation of durability regarding each sample, which was carried out according to the method described in "5.-2-3 Evaluation of Durability".
*4: This is light leakage in the black state observed after durability test regarding each sample.

As in Table above, the samples of the invention had good results. Concretely, the protective films for a polarizing plate of Examples 1 to 17 had higher adhesiveness after the durability test, than the protective films for a polarizing plate of Comparative Examples 1 to 3; and peeling was hardly occurred in the samples of the invention. In the liquid-crystal display devices comprising the protective film for a polarizing plate of Examples 1 to 17, the light leakage after the durability test was smaller than that in the liquid-crystal display devices comprising the protective film for a polarizing plate of Comparative Examples 1 to 3.

In the other test, the polarizing plate was removed in a liquid-crystal display device having a TN-mode liquid-crystal cell (MDT-191S, by Mitsubishi Electric), and in place of it, the polarizing plate comprising the protective film of Examples 1 to 17 was stuck to the device only on the viewing side. In this test, the same results as in Table above were also obtained.

A polarizing plate was fabricated in the same manner as above, for which, however, the WV film (by FUJIFILM) was changed to TD80 (by FUJIFILM). In a commercially-available VA-mode or IPS-mode liquid-crystal display device, the polarizing plate was removed with its retardation film kept remaining as such, and in place of it, the fabricated polarizing plate was stuck to the device in such a manner that the transmission axis of the substitute polarizing plate could be the same as that of the original polarizing plate.

Thus constructed, the liquid-crystal display devices were tested for light leakage in the same manner as in the above; and as a result, the polarizing plates having the protective film for a polarizing plate of the invention all gave good results. In addition, the polarizing plates of Examples of the invention had good scratch resistance and good dust adhesion resistance, and could reduce external light reflection on the display panel owing to low reflectivity and surface scattering, and therefore they had good properties for use as the panel surface of image display devices.

10. Example 21

10.-1 Preparation of Support

10.-1-1 Preparation of Cellulose Acetate Solution

The ingredients shown in the following Table were separately put into a mixing tank and stirred under heating at 30° C. to dissolve the ingredients, thereby preparing cellulose acetate solutions (dopes) for inner layer and outer layer.

| Formulation of Cellulose Acetate Solution | inner layer (mas. pts.) | outer layer (mas. pts.) |
|---|---|---|
| Cellulose acetate having a degree of acetylation of 60.9% | 100 | 100 |
| Triphenyl phosphate (plasticizer) | 7.8 | 7.8 |
| Biphenyldiphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica fine particles (AEROSIL R972, by Nippon Aerosil) | 0 | 0.8 |
| Retardation enhancer of formula (A) mentioned below | 1.7 | 0 |

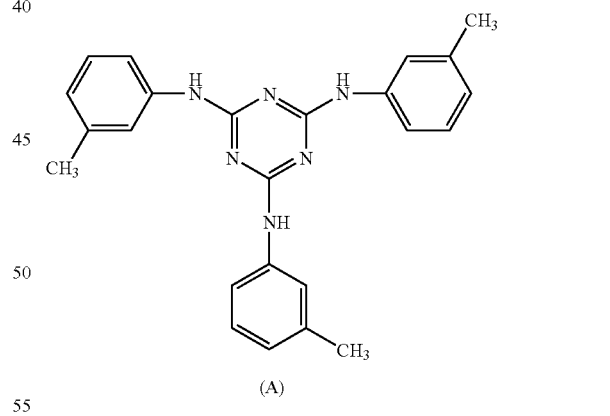

(A)

Thus obtained, the dope for inner layer and the dope for outer layer were cast onto a drum cooled at 0° C., using a three-layer co-casting die. The film having a residual solvent content of 70% by mass was peeled away from the drum. With both edges thereof fixed with a pin tenter, this was conveyed at a stretching ratio in the machine direction of 110% and dried at 80° C.; and when the residual solvent content thereof reached 10%, this was dried at 110° C. Next, this was dried at 140° C. for 30 minutes, thereby producing a cellulose acetate film having a residual solvent content of 0.3% by mass (outer layer: 3 μm, inner layer: 64 μm, outer layer: 3 μm). The optical properties of the produced cellulose acetate film were measured.

The width of the obtained cellulose acetate film was 1340 mm, the thickness thereof was 70 μm. Using KOBRA 21ADH, its retardation (Re) at a wavelength of 550 nm was measured, and was 6 nm. Its retardation (Rth) at a wavelength of 550 nm was measured, and was 90 nm.

10.-1-2 Saponification

An isopropyl alcohol solution of 1.5 N sodium hydroxide was applied to one surface of the prepared cellulose acetate film, in an amount of 25 ml/m², then left at 25° C. for 5 seconds, washed with running water for 10 seconds, and then air at 25° C. was jetted to it to dry the surface of the film. In that manner, only one surface of the cellulose acetate film was saponified.

10.-2 Formation of Alignment Layer (Coating Layer)

On the saponified surface of a support, a coating liquid for coating layer capable of functioning as an alignment layer having the formulation mentioned below was applied in an amount of 31 ml/m², using a wire bar coater of #18. This was dried with hot air at 100° C. for 120 seconds.

Next, in the direction at 0° from the long direction of the cellulose acetate film, the formed alignment layer was rubbed.

| [Formulation of Coating Liquid for Coating Layer: liquid c-1] | |
| --- | --- |
| Polyvinyl alcohol of polymer 2 | 10 mas. pts. |
| Water | 371 mas. pts. |
| Methanol | 119 mas. pts. |
| Crosslinking agent A1 (used in Example 1) | 10 mas. pts. |
| Tartaric acid | 1 mas. pt. |
| Glutaraldehyde (crosslinking agent) | 0.5 mas. pts. |

10.-3 Formation of Optically-Anisotropic Layer 90 parts by mass of discotic liquid-crystal compound (1) shown below, 10 parts by mass of discotic liquid-crystal compound (2) shown below, 1 part by mass of a fluoroaliphatic group-having polymer (1) shown below, 3 parts by mass of a photopolymerization initiator (Irgacure 907, produced by Ciba-Geigy) and 1 part by mass of a sensitizer (Kayacure DETX, by Nippon Kayaku) were dissolved in 216 parts by mass of methyl ethyl ketone to prepare a coating liquid.

Discotic Liquid Crystal Compound (1)

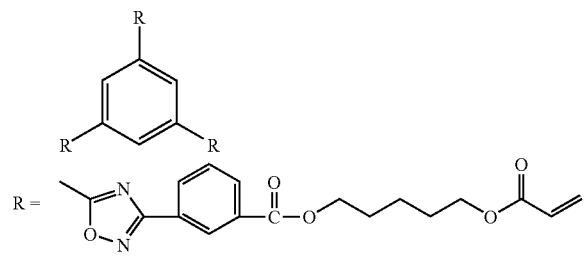

Discotic Liquid Crystal Compound (2)

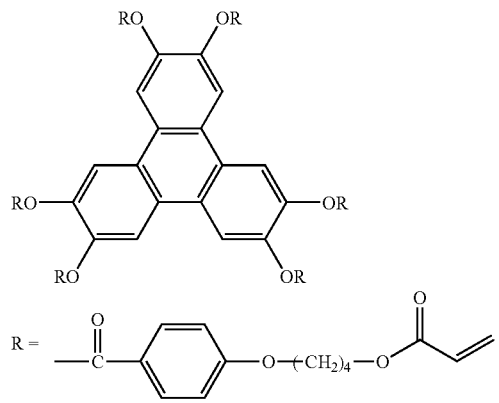

Fluoroaliphatic Group-Having Polymer (1):

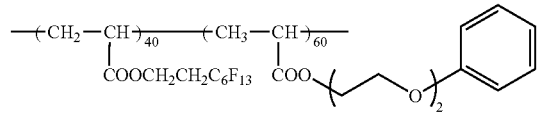

Using a wire bar of #2.0 rotating at 1,171 rpm in the same direction as the film-traveling direction, the coating liquid was continuously applied onto the rubbed surface of a roll of the alignment layer that was kept traveling at 30 m/min. In a process of continuously heating it from room temperature up to 100° C., the solvent was evaporated away, and then this was heated in a drying zone at 115° C. for about 90 seconds, in which the air speed on the film surface of he discotic liquid-crystal compound layer could be 1.5 m/sec in parallel to the film-traveling direction, whereby the discotic liquid-crystal compound was aligned. Next, using a high-pressure mercury lamp (UV lamp, having an output of 160 W/cm and a light emission length of 1.6 m), this was irradiated with 600-mW UV rays at a temperature of 78° C. for 4 seconds to promote crosslinking, and the discotic liquid-crystal compound was fixed as aligned. Next, this was left cooled to room temperature, and then wound up into a cylindrical roll.

In this way, a protective film for a polarizing plate of Example 21, consisting of a transparent film of a cellulose acetate film, a coating layer functioning as an alignment layer and an optically anisotropic layer, was produced.

10.-4 Determination of Optical Properties

In the same manner as in the above, an alignment layer was formed on a glass sheet; and also in the same manner as in the above, an optically-anisotropic layer was formed on the alignment layer. Using KOBRA 21ADH, its Re(550) at a wavelength of 550 nm was measured, and was 49.1 nm.

10.-5 Production of Polarizing Plate

A polyvinyl alcohol (PVA) film having a thickness of 80 μm was dyed by dipping it in an aqueous iodine solution having an iodine concentration of 0.05% by mass, at 30° C. for 60 seconds, and then this was stretched in the machine direction by 5 times the original length while dipped in an aqueous boric acid solution having a boric acid concentration of 4% by mass for 60 seconds, and thereafter this was dried at 50° C. for 4 minutes to give a polarizing film having a thickness of 20 μm.

The protective film of Example 21, produced according to the above mentioned method, was dipped in an aqueous sodium hydroxide solution (1.5 mol/L) at 55° C., and then fully washed with water to remove sodium hydroxide. Next, this was dipped in an aqueous dilute sulfuric acid (0.005 mol/L) at 35° C. for 1 minute and then in water to fully remove the aqueous dilute sulfuric acid solution. Finally, the sample was fully dried at 120° C.

The protective film of Example 21 thus saponified in the manner as above was combined with a commercially-available cellulose acetate film that had been saponified in the same manner as above, and these were stuck to each other via the above-mentioned polarizing film sandwiched therebetween using a polyvinyl alcohol-based adhesive, thereby producing a polarizing plate. The commercially-available cellulose acetate film is FUJITAC TF80UL (manufactured by FUJIFILM). In this, the polarizing film and the protective films on both surfaces of the polarizing film were all rolled-up films, and therefore, they were continuously stuck together as kept in parallel to each other in their machine direction. Accordingly, the machine direction (the casting direction of the cellulose acetate film) of the rolled-up protective film of Example 21 was in parallel to the absorption axis of the polarizing film.

10.-6 Production of TN-Mode Liquid-Crystal Display Device

In a liquid-crystal display device employing a TN-mode liquid-crystal cell (Nippon Acer's AL2216W), a pair of polarizing plates were removed, and in place of them, the polarizing plate produced in the above was stuck each one on both the viewers' side and the backlight side, using an adhesive, in such a manner that its protective film of Example 21 faced the side of the liquid-crystal cell. In this, the two polarizing plates were so disposed that the transmission axis of the polarizing plate on the viewers' side was perpendicular to the transmission axis of the polarizing plate on the backlight side.

11. Examples 21-37 and Comparative Examples 4-6

11.-1 Preparation of Coating Liquids c-2 to c-13 and d-1 to d-2 for Coating Layer (Alignment Layer)

Coating liquids for coating layer, c-2 to c-13 and d-1 to d-2, each having the composition shown in Table below were prepared in the same manner as that for above-mentioned coating liquid c-1 for coating layer (alignment layer). It is to be noted that vinyl alcohol-based resins which were used for preparing these coating liquids were produced in the similar manner to that of Polymer 1. And the identification of each polymer was carried out according to the same method.

| Coating liquid | Vinyl alcohol-based polymer | Titanium compound | Hydroxy carboxylic acid | Aliphatic amine | Glycol |
|---|---|---|---|---|---|
| c-1 | Polymer 2 | tetra-n-butyl titanate | tartaric acid | triethanol amine | 1,2-propane diol |
| c-2 | Polymer 13 | tetra-n-butyl titanate | malic acid | — | 1,2-propane diol |
| c-3 | Polymer 17 | tetra-n-butyl titanate | citric acid | n-propyl amine | — |
| c-4 | Polymer 33 | tetra-iso octyl titanate | — | n-propyl amine | 2,3-butane diol |
| c-5 | Polymer 48 | tetra-iso octyl titanate | lactic acid | — | — |
| c-6 | Polymer 59 | tetra-iso octyl titanate | — | tri n-butyl amine | — |
| c-7 | Polymer 14 | tetra-iso octyl titanate | — | — | 1,2-propane diol |
| c-8 | Polymer 31 | tetra-iso octyl titanate | — | — | — |
| d-1 | Polymer 2 | — | citric acid | n-propyl amine | 2,3-butane diol |

| Coating liquid | Vinyl alcohol-based polymer | Zirconium compound | Amino carboxylic acid |
|---|---|---|---|
| c-9 | Polymer 6 | zirconyl oxychloride | dihydroxy ethylglycine |
| c-10 | Polymer 11 | zirconyl nitrate | leucine |
| c-11 | Polymer 15 | ammonium zirconyl carbonate | 1-amino cyclopropane carboxylic acid |
| c-12 | Polymer 32 | zirconyl sulfate | dihydroxy propylglycine |

| | | -continued | |
|---|---|---|---|
| c-13 | Polymer 39 | basic zirconyl chloride | — |
| d-2 | Polymer 6 | — | dihydroxy methylglycine |

11.-2 Production of Polarizing Plate

In the same manner as in Example 21, protective films for a polarizing plate of Examples 22 to 37 and Comparative Examples 4 to 5 were produced, for which, however, the coating liquid and the thickness of the coating layer were changed as in Table below.

In Comparative Example 6, the optical film used in Comparative Example 3 was used as an alignment layer, and in the same manner as in Example 21, this was rubbed, and then an optically-anisotropic layer was formed, thereby producing a polarizing plate.

The optical films and the polarizing plates produced in Examples 21 to 37 and Comparative Examples 4 to 6 were tested and evaluated in the same manner as in Example 1. Specifically, the optical films were evaluated for the alignment property; and the polarizing plates were for the adhesiveness, the brittleness, and the adhesiveness and the peeling resistance after durability test, and the display unevenness in liquid-crystal display devices. The results are shown in Table below.

11.-3 Evaluation of Displaying—Unevenness on Panel of Liquid-Crystal Display Device The display panel of each of the liquid-crystal display devices of Examples 21 to 37 and Comparative Examples 4 to 6 was controlled to have an intermediate tone on the entire surface, and evaluated for displaying-unevenness. Samples with no unevenness are good (A); those with unevenness in oblique directions are average (B) with no problem in practical use; and those with unevenness in the front direction are bad (C) with problems in practical use. The results are shown in Table below.

| | Coating layer | | Evaluation of Protective Film | | | | Evaluation |
|---|---|---|---|---|---|---|---|
| | | | Before durability test | | After durability test | | of LCD |
| | Coating liquid | Thickness μm | 5.-2-2 *1 | 5.-2-1 *2 | 5.-2-2 *1 | 5.-2-3 *3 | Unevenness *4 |
| Example 21 | c-1 | 1 | A | A | A | A | A |
| Example 22 | c-2 | 1 | A | A | A | A | A |
| Example 23 | c-3 | 1 | A | A | A | A | A |
| Example 24 | c-4 | 1 | A | A | A | B | A |
| Example 25 | c-5 | 1 | A | A | A | A | A |
| Example 26 | c-6 | 1 | A | A | A | A | A |
| Example 27 | c-7 | 1 | A | A | A | A | A |
| Example 28 | c-8 | 1 | A | A | B | B | A |
| Example 29 | c-9 | 1 | A | A | A | A | A |
| Example 30 | c-10 | 1 | A | A | A | A | A |
| Example 31 | c-11 | 1 | A | A | A | A | A |
| Example 32 | c-12 | 1 | A | A | A | A | A |
| Example 33 | c-13 | 1 | A | A | B | B | A |
| Example 34 | c-1 | 0.05 | A | A | A | A | B |
| Example 35 | c-1 | 0.1 | A | A | A | A | A |
| Example 36 | c-1 | 1.3 | A | A | A | A | A |
| Example 37 | c-1 | 2 | A | A | A | A | B |
| Comparative Example 4 | d-1 | 1 | B | A | C | C | C |
| Comparative Example 5 | d-2 | 1 | B | A | C | C | C |
| Comparative Example 6 | — | 29 | C | C | C | C | C |

*1: This is the result of the evaluation of adhesiveness regarding each sample, which was carried out according to the method described in "5.-2-2 Evaluation of Adhesiveness".
*2: This is the result of the evaluation of brittleness regarding each sample, which was carried out according to the method described in "5.-2-1 Evaluation of Brittleness".
*3: This is the result of the evaluation of durability regarding each sample, which was carried out according to the method described in "5.-2-3 Evaluation of Durability".
*4: This is the result of the evaluation of displaying-unevenness regarding each sample, which was carried out according to the method described in "11.-3 Evaluation of Displaying-Unevenness on Panel of Liquid-Crystal Display Device".

As in the above Table, the invention produced good results in that the protective films for a polarizing plate of Examples 21 to 37 all kept good adhesiveness and peeled little after the durability test, as compared with the protective films for a polarizing plate of Comparative Examples 4 to 6, and that the liquid-crystal display devices comprising the protective film for a polarizing plate of Examples 21 to 37 did not suffer from displaying-unevenness, different from the liquid-crystal display devices comprising the protective film for a polarizing plate of Comparative Examples 4 to 6.

12. Examples 38-43

Protective films of Examples 38-43 for a polarizing plate were produced in the same manner as that for producing the protective film of Example 21, except that the coating liquid having the formulation shown below was used for preparing the optically anisotropic layer respectively. Using the protective films respectively, polarizing plates and liquid crystal display devices of Examples 38-43 were produced.

| [Formulation of Coating Liquid for Optically Anisotropic Layer] | |
|---|---|
| dimethyl ketone | 216 mas. pts. |
| discotic liquid crystal compound A shown in Table below | 90 mas. pts. |
| discotic liquid crystal compound A shown in Table below | 10 mas. pts. |
| fluoroaliphatic group-having polymer (1) shown above | 1 mas. pts. |
| photopolymerization initiator (Irgacure 907, produced by Ciba-Geigy) | 3 mas. pts. |
| sensitizer (Kayacure DETX, produced by Nippon Kayaku) | 1 mas. pts. |

| | Discotic Liquid Compound A | Discotic Liquid Compound B |
|---|---|---|
| Example 38 | D-112(described in JPA No. 2006-76992) | |
| Example 39 | D-112(described in JPA No. 2006-76992) | Discotic Liquid Crystal compound (2) shown above |
| Example 40 | D-304(described in JPA No. 2006-76992) | Discotic Liquid Crystal compound (2) shown above |
| Example 41 | D-224(described in JPA No. 2007-2220) | Discotic Liquid Crystal compound (2) shown above |
| Example 42 | D-10((described in JPA No. 2007-2220) | Discotic Liquid Crystal compound (2) shown above |
| Example 43 | D-286(described in JPA No. 2007-2220) | Discotic Liquid Crystal compound (2) shown above |

Regarding polarizing plates of Examples 38-43, evaluations were carried out in the same manner as Example 1, in terms of adhesiveness, brittleness, adhesiveness and peeling after durability test. Regarding liquid crystal display devices of Example 38-43, evaluations were carried out in the same manner as Example 21, in terms of displaying- unevenness. And it was confirmed that Examples 38-43 showed equivalent results, compared with Example 21.

The results were shown in Table below.

| | Coating liquid | Coating layer Thickness μm | Evaluation of Protective Film | | | | Evaluation of LCD Unevenness *4 |
|---|---|---|---|---|---|---|---|
| | | | Before durability test | | After durability test | | |
| | | | 5.-2-2 *1 | 5.-2-1 *2 | 5.-2-2 *1 | 5.-2-3 *3 | |
| Example 38 | c-1 | 1 | A | A | A | A | A |
| Example 39 | c-1 | 1 | A | A | A | A | A |
| Example 40 | c-1 | 1 | A | A | A | A | A |
| Example 41 | c-1 | 1 | A | A | A | A | A |
| Example 42 | c-1 | 1 | A | A | A | A | A |
| Example 43 | c-1 | 1 | A | A | A | A | A |

*1: This is the result of the evaluation of adhesiveness regarding each sample, which was carried out according to the method described in "5.-2-2 Evaluation of Adhesiveness".
*2: This is the result of the evaluation of brittleness regarding each sample, which was carried out acto the method described in "5.-2-1 Evaluation of Brittleness".
*3: This is the result of the evaluation of durability regarding each sample, which was carried out according to the method described in "5.-2-3 Evaluation of Durability".
*4: This is the result of the evaluation of displaying-unevenness regarding each sample, which was carried out according to the method described in "11.-3 Evaluation of Displaying-Unevenness on Panel of Liquid-Crystal Display Device".

What is claimed is:

1. An optical film comprising a transparent film, and, on the film, at least one layer formed by applying a composition comprising a zirconium compound, a vinyl alcohol-based resin, and an aminocarboxylic acid or its derivative to a surface.

2. The optical film of claim 1, wherein the zirconium compound is a water-soluble, inorganic salt, organic salt or complex salt.

3. The optical film of claim 1, wherein the composition comprises at least one selected from the group consisting of a hydroxycarboxylic acid, an aliphatic amine and a compound represented by following formula (I):

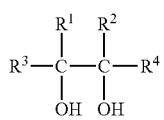

(I)

wherein $R^1$, $R^2$, $R^3$ and $R^4$ each represent a hydrogen atom, an alkyl group or a hydroxyalkyl group.

4. The optical film of claim 1, wherein the thickness of the layer is from 0.1 μm to 10 μm.

5. The optical film of claim 1, wherein the vinyl alcohol-based resin is a polyvinyl alcohol derivative in which at least one hydroxyl group is substituted with a group having at least one of a vinyl moiety, an oxiranyl moiety and an aziridinyl moiety.

6. The optical film of claim 1, wherein the layer functions as an alignment layer.

7. The optical film of claim 1, wherein the layer functions as a barrier layer for reducing moisture permeability.

8. The optical film of claim 1, wherein at least one surface of the transparent film is subjected to an alkali-saponification treatment.

9. The optical film of claim 1, wherein the transparent film comprises a cellulose acylate.

10. The optical film of claim 1, wherein the transparent film comprises a saponified cellulose acylate.

11. A polarizing plate comprising, at least, a polarizing film and the optical film as set forth in claim 1.

12. A liquid crystal display device comprising a liquid crystal cell and the polarizing plate as set forth in claim 11.

* * * * *